US007302065B2

(12) United States Patent
Furuta

(10) Patent No.: US 7,302,065 B2
(45) Date of Patent: Nov. 27, 2007

(54) NOISE SUPPRESSOR

(75) Inventor: Satoru Furuta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 624 days.

(21) Appl. No.: 10/343,744

(22) PCT Filed: May 24, 2002

(86) PCT No.: PCT/JP02/05061

§ 371 (c)(1), (2), (4) Date: Feb. 6, 2003

(87) PCT Pub. No.: WO02/101729

PCT Pub. Date: Dec. 19, 2002

(65) Prior Publication Data

US 2003/0128851 A1 Jul. 10, 2003

(30) Foreign Application Priority Data

Jun. 6, 2001 (JP) ............................ 2001-171584

(51) Int. Cl.
*H04B 15/00* (2006.01)
*G10L 21/00* (2006.01)
*G10L 21/02* (2006.01)

(52) U.S. Cl. .................. 381/94.3; 381/94.1; 381/94.2; 704/226

(58) Field of Classification Search .................... 381/2, 381/94.1, 94.2, 94.3; 704/226
See application file for complete search history.

(56) References Cited

U.S. PATENT DOCUMENTS 5,636,324 A * 6/1997 Teh et al. .................. 704/226

(Continued)

FOREIGN PATENT DOCUMENTS

EP 0727769 8/1996

(Continued)

OTHER PUBLICATIONS

Stefan Gustafsson et al.: "A novel psychoacoustically motivated audio enhancement algorithm preserving background noise characteristics" Proceedings IF ICASSP-98, vol. 1, pp. 397-400, May 12, 1998.

(Continued)

*Primary Examiner*—Vivian Chin
*Assistant Examiner*—Douglas Suthers
(74) *Attorney, Agent, or Firm*—Oblon, Spivak, McClelland, Maier & Neustadt, P.C.

(57) ABSTRACT

An amplitude suppression quantity denoting a noise suppression level of a current frame is calculated in an amplitude suppression quantity calculating unit (20), a perceptual weight distributing pattern of both a spectral subtraction quantity and a spectral amplitude suppression quantity is determined in a perceptual weight pattern adjusting unit (21), the spectral subtraction quantity and the spectral amplitude suppression quantity given by the perceptual weight distributing pattern are corrected according to a frequency band SN ratio in a perceptual weight correcting unit (7), a noise subtracted spectrum is calculated from an amplitude spectrum, a noise spectrum and a corrected spectral subtraction quantity in a spectrum subtracting unit (8), and a noise suppressed spectrum is calculated from the noise subtracted spectrum and a corrected spectral amplitude suppression quantity in a spectrum suppressing unit (9).

19 Claims, 17 Drawing Sheets

U.S. PATENT DOCUMENTS 5,757,937 A * 5/1998 Itoh et al. .................. 381/94.3
6,671,667 B1 * 12/2003 Chandran et al. ........... 704/233
7,043,030 B1 * 5/2006 Furuta ....................... 381/94.1

FOREIGN PATENT DOCUMENTS

| | | |
|---|---|---|
| EP | 1059628 | 12/2000 |
| EP | 1100077 | 5/2001 |
| JP | 10-97288 | 4/1998 |
| JP | 10-161694 | 6/1998 |
| JP | 2000-47697 | 2/2000 |

OTHER PUBLICATIONS

Kenzo Itoh et al.: "Environmental noise reduction based on speech/ non-speech identification for hearing aids" Proceedings of ICASSP-97, vol. 1, pp. 419-422, Apr. 21, 1997.

Steven F. Boll: "Suppression of acoustic noise in speech using spectral subtraction" IEEE Trans. ASSP, vol. ASSP-27, No. 2, pp. 113-120, Apr. 1979.

* cited by examiner

| NOISE-LIKENESS SIGNAL Noise | NOISE-LIKENESS | NOISE SPECTRUM UPDATING RATE COEFFICIENTS r |
|---|---|---|
| 0 | LOUD NOISE | 0.5 |
| 1 | · | 0.6 |
| 2 | · | 0.8 |
| 3 | · | 0.95 |
| 4 | LITTLE NOISE | 0.9999 |

NOISE SUPPRESSOR

TECHNICAL FIELD

The present invention relates to a noise suppressing apparatus for suppressing noises other than an object signal in a speech communication system or a speech recognition system used in various noise circumstances.

BACKGROUND ART

In a conventional noise suppressing apparatus, an input signal including a speech signal and noises superimposed on the speech signal is received, the noises denoting a non-object signal are suppressed to remove the noises from the input signal, and the speech signal denoting an object signal is emphasized. This conventional noise suppressing apparatus is, for example, disclosed in Published Unexamined Japanese Patent Application No. 2000-347688. The conventional noise suppressing apparatus is operated according to a so-called spectral subtraction method. This spectral subtraction method is introduced in a document (Steven F. Boll, "Suppression of Acoustic Noise in Speech Using Spectral Subtraction", IEEE Trans. ASSP, Vol. ASSP-27, No. 2, April 1979). In this document, an average noise spectrum is assumed, and the assumed average noise spectrum is subtracted from an amplitude spectrum to suppress noises.

FIG. 1 is a block diagram showing the configuration of a conventional noise suppressing apparatus disclosed in the Published Unexamined Japanese Patent Application No. 2000-347688. In FIG. 1, 1 indicates an input terminal, 2 indicates a time-to-frequency converting unit, 3 indicates a noise-likeness analyzing unit, 4 indicates a noise spectrum estimating unit, 5 indicates a frequency band signal-to-noise ratio calculating unit, 6 indicates a perceptual weight calculating unit, 7 indicates a perceptual weight correcting unit, 8 indicates a spectrum subtracting unit, 9 indicates a spectrum suppressing unit, 10 indicates a frequency-to-time converting unit, and 11 indicates an output terminal. Also, in the noise-likeness analyzing unit 3, 12 indicates a low pass filter, 13 indicates an inverted filter, 14 indicates an auto-correlation analyzing unit, 15 indicates a linear prediction analyzing unit, and 16 indicates an updating rate determining unit.

Next, an operation will be described below.

An input signal s[t] having noises is sampled at a prescribed sampling frequency (for example, 8 kHz), the input signal s[t] is divided into a plurality of frames at a prescribed frame cycle (for example, 20 ms), and the input signal s[t] is received in the conventional noise suppressing apparatus. In the time-to-frequency converting unit 2, the frequency of the input signal s[t] is, for example, analyzed by using a 256-point fast Fourier transformation (FFT), and the input signal s[t] is converted into an amplitude spectrum S[f] and a phase spectrum P[f]. Here, because the FFT is well known, the description of the FFT is omitted.

In the noise-likeness analyzing unit 3, the filter processing is first performed for the input signal s[t] in the low pass filter 12 to obtain a low pass filter signal sl[t]. Thereafter, a linear predictive analysis is performed for the low pass filter signal sl[t] in the linear prediction analyzing unit 15, and both a linear predictive coefficient of a tenth-order a parameter and a frame power POWfr are, for example, obtained. In the inverted filter 13, the inverted filter processing is performed for the low pass filter signal sl[t] by using the linear predictive coefficient, and a low pass linear predictive residual signal (hereinafter, called a low pass residual signal) res[t] is output. Thereafter, in the auto-correlation analyzing unit 14, an auto-correlation analysis is performed for the low pass residual signal res[t] to obtain a positive peak value of an auto-correlation coefficient from an auto-correlation coefficient train rac[t], and the positive peak value is set as RACmax.

In the updating rate determining unit 16, a noise-likeness signal Noise is determined, for example, by using the positive peak value RACmax of the auto-correlation coefficient, a power POWres of the low pass residual signal res[t] and the frame power POWfr, and a noise spectrum updating rate coefficient r corresponding to the determined noise-likeness signal Noise is determined and output. FIG. 2 is a view showing the relation between the noise-likeness signal Noise and the noise spectrum updating rate coefficient r. In the updating rate determining unit 16, the noise-likeness signal Noise is, for example, determined as one level selected from five levels shown in FIG. 2, the noise spectrum updating rate coefficient r corresponding to the determined noise-likeness signal Noise is determined and output.

In the noise spectrum estimating unit 4, a noise spectrum N[f] is updated according to an equation (1) by using the noise spectrum updating rate coefficient r output from the noise-likeness analyzing unit 3, and the amplitude spectrum S[f] output from the time-to-frequency converting unit 2 and an average noise spectrum Nold[f] of preceding noise spectrums N[f] held inside.

$$N[f]=(1-r)\times \mathrm{Nold}[f]+r\times S[f] \quad (1)$$

In the frequency band signal-to-noise ratio calculating unit 5, a signal-to-noise ratio (or a frequency band SN ratio) SNR[f] is calculated according to an equation (2) for each frequency band f by using both the amplitude spectrum [f] output from the time-to-frequency converting unit 2 and the noise spectrum N[f] output from the noise spectrum estimating unit 4. Here, the frequency band SN ratio SNR[f] is set to zero in a case where the frequency band SN ratio SNR[f] is negative.

$$\begin{aligned} SNR[f] &= 20\times \log 10(S[f]/N[f]) \quad (\mathrm{dB});\ S[f]>N[f] \\ &= 0 \quad (\mathrm{dB});\ \text{other cases} \end{aligned} \quad (2)$$

In the perceptual weight calculating unit 6, prescribed constants α, α' (for example, α=1.2, α'=0.5), β, β' (for example, β=0.8, β'=0.1), γ' and γ (for example, γ=0.25, γ'=0.4) are received, and a first perceptual weight αw(f), a second perceptual weight βw(f) and a third perceptual weight γw(f) respectively weighted in a frequency direction are calculated according to an equation (3). Here, fc in the equation (3) denotes a Nyquist frequency.

$$\alpha w(f)=(\alpha'-\alpha)\times f/fc+\alpha$$

$$\beta w(f)=(\beta'-\beta)\times f/fc+\beta$$

$$\gamma w(f)=(\gamma'-\gamma)\times f/fc+\gamma \quad (3)$$

In the perceptual weight correcting unit 7, the first perceptual weight αw(f) and the second perceptual weight βw(f) are corrected according to an equation (4) by using the band frequency SN ratio SNR[f] output from the frequency band signal-to-noise ratio calculating unit 5. The first perceptual weight αw(f) and the second perceptual weight βw(f) are corrected according to each band frequency SN ratio. For example, in a case where the band frequency SN ratio SNR[f] is low, the first perceptual weight αw(f) and the second perceptual weight βw(f) are corrected to low values. As the band frequency SN ratio SNR[f] becomes higher, the first perceptual weight αw(f) and the second perceptual weight βw(f) become higher together. A first corrected perceptual weight αc(f) and the third perceptual weight γw(f) are output to the spectrum subtracting unit 8, and a second corrected perceptual weight βc(f) is output to the spectrum suppressing unit 9.

$$\alpha c(f)=\alpha w(f)\times \mathrm{SNR}[f]-\mathrm{MIN\_GAIN}_\alpha$$

$$\beta c(f)=\beta w(f)\times \mathrm{SNR}[f]-\mathrm{MIN\_GAIN}_\beta \quad (4)$$

Here, in the equation (4), $\mathrm{MIN\_GAIN}_\alpha$ and $\mathrm{MIN\_GAIN}_\beta$ denote prescribed constants respectively, $\mathrm{MIN\_GAIN}_\alpha$ indicates a maximum suppression quantity [dB] of the first perceptual weight αw(f), and $\mathrm{MIN\_GAIN}_\beta$ indicates a maximum suppression quantity [dB] of the second perceptual weight βw(f).

FIG. 3 is a view showing an example of frequency-directional weighting control for the first perceptual weight αc(f) and the second perceptual weight βc(f) used for both the spectral subtraction and the spectral amplitude suppression described later. In FIG. 3, 101 indicates a spectral subtraction quantity αc(f) denoting the first perceptual weight, 102 indicates a spectral amplitude suppression quantity βc(f) denoting the second perceptual weight, 103 indicates a speech spectrum, and 104 indicates a noise spectrum. In the perceptual weight correcting unit 7, as is formulated in an equation (5), in a case where an average SN ratio SNRave of a current frame is high, the spectral subtraction quantity αc(f) is set so as to increase the difference between αc(f) and αc(0). That is, the inclination of αc(f) in FIG. 3 becomes large. Also, in the perceptual weight correcting unit 7, in a case where the average SN ratio SNRave is high, the spectral amplitude suppression quantity βc(f) is set so as to decrease the difference between βc(f) and βc(0). That is, the inclination of βc(f) in FIG. 3 becomes small. Also, as the average SN ratio SNRave of the current frame becomes lower, the difference between αc(f) and αc(0) is set to be a smaller value. That is, the inclination of αc(f) becomes small. In contrast, the difference between βc(f) and βc(0) is set to be a larger value. That is, the inclination of βc(f) becomes large.

$$\mathrm{SNRave}=\Sigma(\mathrm{SNR}[f])/fc,\ f=0, \ldots, fc \quad (5)$$

In the spectrum subtracting unit 8, as is formulated in an equation (6), the noise spectrum N[f] is multiplied by the first corrected perceptual weight αc(f), and the obtained product is subtracted from the amplitude spectrum S[f] to obtain a noise subtracted spectrum Ss[f]. The noise subtracted spectrum Ss[f] is output. Also, in a case where the noise subtracted spectrum Ss[f] becomes negative, the noise subtracted spectrum Ss[f] is, for example, replaced with a product obtained by multiplying the amplitude spectrum S[f] of the input signal by the third perceptual weight γw(f). That is, the back filling processing is performed to set the product as the noise subtracted spectrum Ss[f].

$$\begin{aligned} Ss[f] &= S[f]-\alpha c(f)\times N[f]; & S[f] > \alpha c(f)\times N[f] \\ &= \gamma w(f)\times S[f]; & \text{other cases} \end{aligned} \quad (6)$$

In the spectrum suppressing unit 9, as is formulated in an equation (7), the noise subtracted spectrum Ss[f] is multiplied by a value relating to the second corrected perceptual weight βc(f) to obtain a noise suppressed spectrum Sr[f] in which an amplitude of noises is decreased. The noise suppressed spectrum Sr[f] is output.

$$Sr[f]=10\hat{}(-\beta c(f))\times Ss[f] \quad (7)$$

Here, $10\hat{}(-\beta c(f)=10^{-\beta c(f)}$ is satisfied.

In the frequency-to-time converting unit 10, the inverted procedure to that of the processing performed in the time-to-frequency converting unit 2 is performed. For example, the inverse FFT is performed to convert both the noise suppressed spectrum Sr[f] and the phase spectrum P[f] output from the time-to-frequency converting unit 2 into a time signal, and a time signal component of a preceding frame is superimposed on a portion of this time signal to obtain a noise suppressed signal sr[t]. The noise suppressed signal sr[t] is output from the output signal terminal 11.

As is described above, in the conventional noise suppressing apparatus, the first corrected perceptual weight αc(f) and the second corrected perceptual weight βc(f) respectively weighted in a frequency direction are obtained by performing the correction according to the frequency band SN ratio SNR[f], the spectral subtraction and the spectral amplitude suppression are performed for the amplitude spectrum S[f] of the input signal according to the average SN ratio SNRave of the current frame by using the first corrected perceptual weight αc(f) and the second corrected perceptual weight βc(f). That is, the first corrected perceptual weight αc(f) and the second corrected perceptual weight βc(f) are controlled to be heightened in a frequency band in which the band frequency SN ratio SNR[f] is high, and the first corrected perceptual weight αc(f)and the second corrected perceptual weight βc(f) are controlled to be lowered in a frequency band in which the band frequency SN ratio SNR[f] is low. Therefore, in the spectral subtraction processing, noises are largely subtracted from the amplitude spectrum S[f] in a frequency band (mainly, a low frequency band) in which the SN ratio is high, and noises are slightly subtracted from the amplitude spectrum S[f] in a frequency band (mainly, a high frequency band) in which the SN ratio is high. Accordingly, noises having a major component in a low frequency band and generated in the running of a motor vehicle can be effectively suppressed, and an excess subtraction from the amplitude spectrum S[f] can be prevented. Also, in the spectral amplitude suppression, the amplitude suppression is slightly performed in a low frequency band, and the amplitude suppression becomes stronger as the frequency band approaches a high frequency band. Accordingly, the occurrence of unnatural and unpleasant residual noises called a musical noise can be prevented.

Because the conventional noise suppressing apparatus has the configuration described above, for example, even in a case where the noise subtraction based on the first perceptual weight αc(f) exceeds a prescribed quantity, the conventional noise suppressing apparatus has no mechanism to limit the noise amplitude suppression based on the second corrected perceptual weight βc(f), and the first corrected perceptual weight αc(f) and the second corrected perceptual weight βc(f) are independently controlled. Therefore, a following problem has arisen. That is, a total quantity of the noise suppression (hereinafter, called a total noise suppression quantity) based on both the first corrected perceptual weight αc(f)and the second corrected perceptual weight βc(f) is not set to a constant value for each frame, unstable feeling in a time direction occurs in the output signal, and the output signal is not preferable with respect to the feeling in the hearing sensation.

The present invention is provided to solve the above-described problem, and the object of the present invention is to provide a noise suppressing apparatus in which noises are preferably suppressed with respect to the feeling in the hearing sensation and the deterioration of a speech quality is low even in a high noise circumstance.

DISCLOSURE OF THE INVENTION

A noise suppressing apparatus according to the present invention includes an amplitude suppression quantity calculating unit for calculating an amplitude suppression quantity denoting a noise suppression level of a current frame from a noise-likeness signal and a noise spectrum, a perceptual weight pattern adjusting unit for determining a perceptual weight distributing pattern denoting a frequency characteristic distributing pattern of both a spectral subtraction quantity denoting a first perceptual weight and a spectral amplitude suppression quantity denoting a second perceptual weight from the amplitude suppression quantity and the noise-likeness signal, a perceptual weight correcting unit for correcting the spectral subtraction quantity denoting the first perceptual weight and the spectral amplitude suppression quantity denoting the second perceptual weight according to a frequency band signal-to-noise ratio and outputting a corrected spectral subtraction quantity and a corrected spectral amplitude suppression quantity, a spectrum subtracting unit for subtracting a spectrum, which is obtained by multiplying the corrected spectral subtraction quantity by the noise spectrum, from an amplitude spectrum to obtain a noise subtracted spectrum, and a spectrum suppressing unit for multiplying the noise subtracted spectrum by the corrected spectral amplitude suppression quantity to obtain a noise suppressed spectrum.

Therefore, because an output signal obtained after the noise suppression is stabilized in a time direction, the noise suppression preferable for the feeling in the hearing sensation can be performed. Also, the noise suppression can be performed even in a high noise circumstance while reducing the deterioration of the speech quality.

In the noise suppressing apparatus according to the present invention, the perceptual weight correcting unit performs to enlarge the spectral subtraction quantity denoting the first perceptual weight in a low frequency band corresponding to the frequency band signal-to-noise ratio of a high value, to reduce the spectral amplitude suppression quantity denoting the second perceptual weight in the low frequency band, to reduce the spectral subtraction quantity denoting the first perceptual weight in a high frequency band corresponding to the frequency band signal-to-noise ratio of a low value, and to enlarge the spectral amplitude suppression quantity denoting the second perceptual weight in the high frequency band.

Therefore, noises generated in the running of a motor vehicle and having a major noise component in a low frequency band can be effectively suppressed, and the deformation of the speech spectrum can be prevented by preventing the excessive subtraction of the spectrum in a high frequency band. Also, when the spectral subtraction processing is performed for a speech signal on which noises generated in the running of a motor vehicle and having a major noise component in a low frequency band are superimposed, residual noises of the high frequency band cannot be removed in the spectral subtraction processing in the prior art. However, the residual noises of the high frequency band can be suppressed in the present invention.

In the noise suppressing apparatus according to the present invention, a plurality of perceptual weight basic distributing patterns denoting a plurality of frequency characteristic patterns corresponding to values of the noise-likeness signal are prepared by the perceptual weight pattern adjusting unit as a basis of the determination of the perceptual weight distributing pattern, one frequency characteristic pattern corresponding to the noise-likeness signal output from the noise-likeness analyzing unit is selected, and the perceptual weight distributing pattern denoting the selected frequency characteristic pattern is determined.

Therefore, in a case where the noise-likeness of the noise-likeness signal is small, a rate of the spectral subtraction in the low frequency band is enlarged, and a large noise suppression quantity can be obtained. Also, as the noise-likeness is enlarged, a rate of the spectral subtraction in the low frequency band is reduced. Therefore, the deformation of the spectrum can be prevented.

In the noise suppressing apparatus according to the present invention, the perceptual weight basic distributing patterns denoting the frequency characteristic patterns prepared by the perceptual weight pattern adjusting unit are arbitrarily changed according to use circumstances.

Therefore, the precision of both the corrected spectral subtraction quantity and the corrected spectral amplitude suppression quantity can be heightened, and the noise suppression can be performed while further reducing the deterioration of the speech quality.

The noise suppressing apparatus according to the present invention further includes a perceptual weight pattern changing unit for calculating a ratio of a high frequency band power of the amplitude spectrum to a low frequency band power of the amplitude spectrum, and the perceptual weight distributing pattern is determined by the perceptual weight pattern adjusting unit according to the ratio of the high frequency band power of the amplitude spectrum to the low frequency band power of the amplitude spectrum.

Therefore, a perceptual weight distributing pattern can be adapted to the spectrum shape of a speech time period, and the noise suppression preferable for the feeling in the hearing sensation can be performed.

The noise suppressing apparatus according to the present invention further includes a perceptual weight pattern changing unit for calculating a ratio of a high frequency band power of a noise spectrum to a low frequency band power of a noise spectrum, and the perceptual weight distributing pattern is determined by the perceptual weight pattern adjusting unit according to the ratio of the high frequency band power of the noise spectrum to the low frequency band power of the noise spectrum.

Therefore, a perceptual weight distributing pattern can be adapted to an average spectrum shape of a noise time period, and the noise suppression preferable for the feeling in the hearing sensation can be performed.

The noise suppressing apparatus according to the present invention further includes a perceptual weight pattern changing unit for calculating a ratio of a high frequency band power of an average spectrum obtained from a weighted average of both the amplitude spectrum and the noise spectrum to a low frequency band power of the average spectrum, and the perceptual weight distributing pattern is determined by the perceptual weight pattern adjusting unit according to the ratio of the high frequency band power of the average spectrum to the low frequency band power of the average spectrum.

Therefore, the shapes of the amplitude spectrum of the input signal and the noise spectrum can be added to the perceptual weight distributing pattern, and the noise suppression preferable for the feeling in the hearing sensation can be performed.

In the noise suppressing apparatus according to the present invention, a noise subtracted spectrum is calculated by the spectrum subtracting unit from an amplitude spectrum, an amplitude suppression quantity and a third perceptual weight, which is enlarged as a frequency is heightened, in a case where the noise subtracted spectrum obtained as a subtracting result is negative.

Therefore, the generation of a sharp spectrum, which is isolated on a frequency axis and is one of causes of the generation of the musical noise, can be suppressed. Also, a spectrum shape of residual noises of the high frequency band can be made similar to the amplitude spectrum of an input signal in a speech time period. Therefore, the residual noises of the high frequency band become similar to the speech signal, the natural feeling of the speech can be improved, and the noise suppression preferable for the feeling in the hearing sensation can be performed.

In the noise suppressing apparatus according to the present invention, a noise subtracted spectrum is calculated by the spectrum subtracting unit from a noise spectrum, an amplitude suppression quantity and a third perceptual weight, which is enlarged as a frequency is heightened, in a case where the noise subtracted spectrum obtained as a subtracting result is negative.

Therefore, the generation of a sharp spectrum, which is isolated on a frequency axis and is one of causes of the generation of the musical noise, can be suppressed. Also, residual noises of the high frequency band can be stabilized in the time and frequency directions, and the noise suppression preferable for the feeling in the hearing sensation can be performed.

In the noise suppressing apparatus according to the present invention, a noise subtracted spectrum is calculated by the spectrum subtracting unit from the average spectrum calculated by the perceptual weight pattern changing unit, an amplitude suppression quantity and a third perceptual weight, which is enlarged as a frequency is heightened, in a case where the noise subtracted spectrum obtained as a subtracting result is negative.

Therefore, the generation of a sharp spectrum, which is isolated on a frequency axis and is one of causes of the generation of the musical noise, can be suppressed. Also, because the amplitude spectrum of an input signal and the noise spectrum can be added to a spectrum of residual noises of a high frequency band, the natural feeling of the residual noises can be improved, and the noise suppression preferable for the feeling in the hearing sensation can be performed.

In the noise suppressing apparatus according to the present invention, a third perceptual weight is enlarged as a frequency is heightened, and the third perceptual weight is changed by the perceptual weight correcting unit according to the ratio of the high frequency band power of the amplitude spectrum to the low frequency band power of the amplitude spectrum.

Therefore, the generation of the musical noise can be suppressed. Also, the noise suppression preferable for the feeling in the hearing sensation can be performed.

In the noise suppressing apparatus according to the present invention, a third perceptual weight is enlarged as a frequency is heightened, and the third perceptual weight is changed by the perceptual weight correcting unit according to the ratio of the high frequency band power of the noise spectrum to the low frequency band power of the noise spectrum.

Therefore, the generation of the musical noise can be suppressed. Also, the noise suppression preferable for the feeling in the hearing sensation can be performed.

In the noise suppressing apparatus according to the present invention, a third perceptual weight is enlarged as a frequency is heightened, and the third perceptual weight is changed by the perceptual weight correcting unit according to the ratio of the high frequency band power to the low frequency band power in the average spectrum obtained from the weighted average of both the amplitude spectrum and the noise spectrum.

Therefore, the generation of the musical noise can be suppressed. Also, the noise suppression preferable for the feeling in the hearing sensation can be performed.

In the noise suppressing apparatus according to the present invention, the average spectrum is calculated according to the noise-likeness signal by the perceptual weight pattern changing unit.

Therefore, the noise suppression preferable for the feeling in the hearing sensation can be performed.

A noise suppressing apparatus according to the present invention includes amplitude suppression quantity calculating means for judging an input signal to obtain noise-likeness from the input signal, obtaining a noise spectrum from the input signal and calculating an amplitude suppression quantity denoting a noise suppression level of a current frame according to the noise-likeness and the noise spectrum, and frequency characteristic distributing pattern determining means for determining a frequency characteristic distributing pattern of both a spectrum subtraction quantity and a spectrum amplitude suppression quantity according to both the amplitude suppression quantity and the noise-likeness, wherein a noise other than an object signal included in the input signal is suppressed according to the spectrum subtraction quantity denoting the first perceptual weight and the spectrum amplitude suppression quantity denoting the second perceptual weight.

Therefore, because an output signal obtained after the noise suppression is stabilized in a time direction, the noise suppression preferable for the feeling in the hearing sensation can be performed. Also, the noise suppression can be performed even in a high noise circumstance while reducing the deterioration of the speech quality.

BEST MODE FOR CARRYING OUT THE INVENTION

Hereinafter, the best mode for carrying out the present invention will now be described with reference to the accompanying drawings to explain the present invention in more detail.

EMBODIMENT 1

Figure 4:
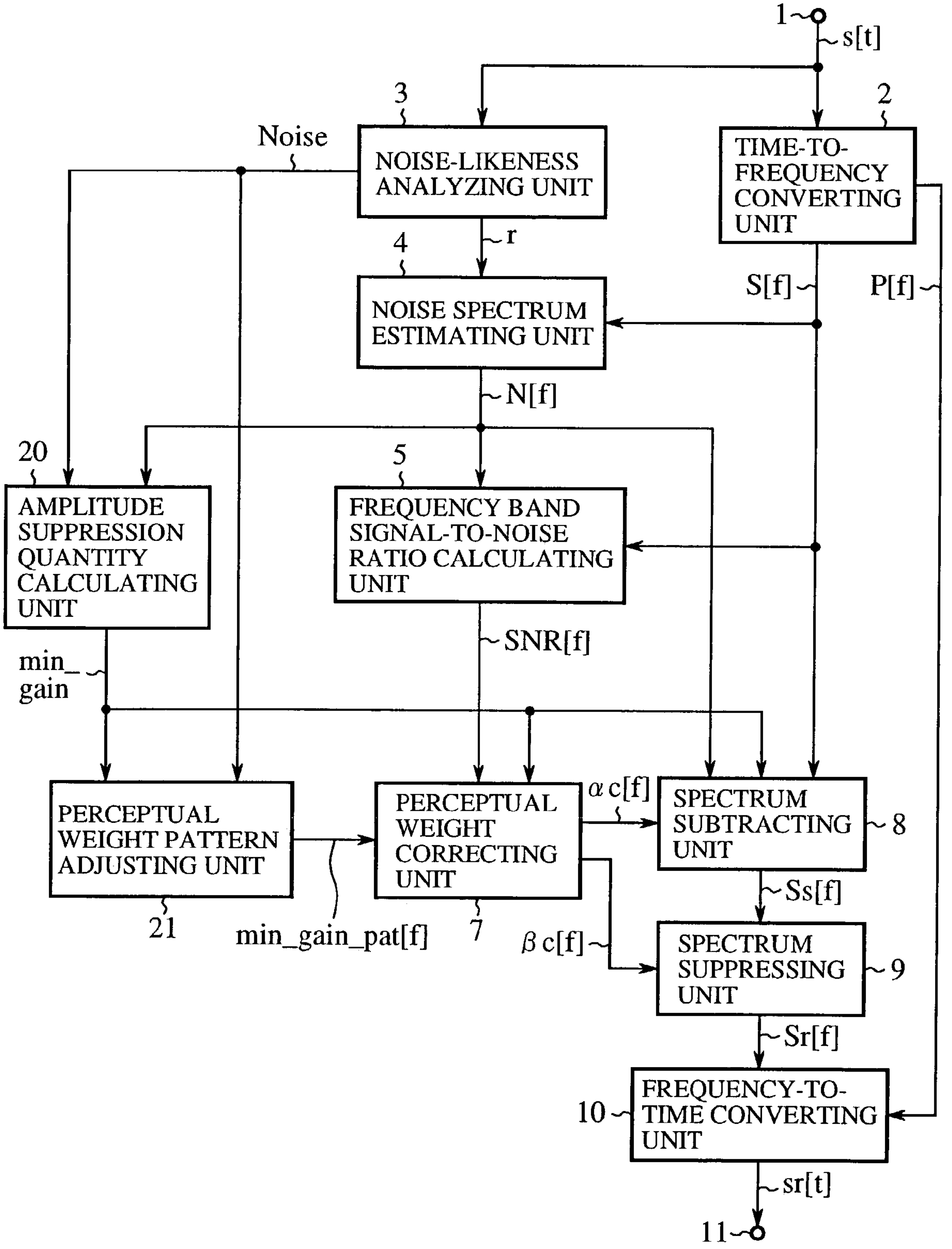
FIG. 4 is a block diagram showing the configuration of a noise suppressing apparatus according to a first embodiment of the present invention.

FIG. 4 is a block diagram showing the configuration of a noise suppressing apparatus according to a first embodiment of the present invention. In FIG. 4, 1 indicates an input terminal for receiving an input signal s[t]. 2 indicates a time-to-frequency converting unit for performing the frequency analysis for the input signal s[t] to convert the input signal s[t] into an amplitude spectrum S[f] and a phase spectrum P[f]. 3 indicates a noise-likeness analyzing unit for judging the input signal s[t] to obtain noise-likeness from the input signal s[t], outputting a noise-likeness signal Noise denoting the noise-likeness, and outputting a noise spectrum updating rate coefficient r corresponding to the noise-likeness signal Noise.

Also, in FIG. 4, 4 indicates a noise spectrum estimating unit for updating a noise spectrum N[f] according to the noise spectrum updating rate coefficient r, the amplitude spectrum S[f] and an average noise spectrum Nold[f] of preceding noise spectrums N[f] held inside and outputting the noise spectrum N[f]. 5 indicates a frequency band signal-to-noise (SN) ratio calculating unit for calculating a band frequency SN ratio SNR[f] denoting a signal-to-noise ratio from the amplitude spectrum S[f] and the noise spectrum N[f] for each frequency band f.

Also, in FIG. 4, 20 indicates an amplitude suppression quantity calculating unit for calculating an amplitude suppression quantity min_gain denoting a noise suppression level of a current frame from the noise-likeness signal Noise and the noise spectrum N[f]. 21 indicates a perceptual weight pattern adjusting unit for determining a perceptual weight distributing pattern min_gain_pat[f] denoting a frequency characteristic distributing pattern of both a spectral subtraction quantity α[f] denoting a first perceptual weight and a spectral amplitude suppression quantity β[f] denoting a second perceptual weight according to both the amplitude suppression quantity min_gain and the noise-likeness signal Noise. 7 indicates a perceptual weight correcting unit for correcting the spectral subtraction quantity α[f] denoting the first perceptual weight and the spectral amplitude suppression quantity β[f] denoting the second perceptual weight given by the perceptual weight distributing pattern min_gain_pat[f] according to the frequency band SN ratio SNR[f], and outputting a corrected spectral subtraction quantity αc[f] denoting a first corrected perceptual weight and a corrected spectral amplitude suppression quantity βc[f] denoting a second corrected perceptual weight.

Also, in FIG. 4, 8 indicates a spectrum subtracting unit for subtracting a spectrum, which is obtained by multiplying the noise spectrum N[f] by the corrected spectral subtraction quantity αc[f], from the amplitude spectrum S[f] to obtain a noise subtracted spectrum Ss[f]. 9 indicates a spectrum suppressing unit for multiplying the noise subtracted spectrum Ss[f] by the corrected spectral amplitude suppression quantity βc[f] to obtain a noise suppressed spectrum Sr[f]. 10 indicates a frequency-to-time converting unit for converting the noise suppressed spectrum Sr[f] into a time signal according to the phase spectrum P[f] and outputting a noise suppressed signal sr[t]. 11 indicates an output terminal of the noise suppressed signal sr[t].

Next, an operation will be described below.

In the same manner as in the prior art, in the time-to-frequency converting unit 2, the frequency analysis is performed for the input signal s[t] to convert the input signal s[t] into an amplitude spectrum S[f] and a phase spectrum P[f], and the amplitude spectrum S[f] and the phase spectrum P[f] are output. In the noise-likeness analyzing unit 3, it is judged that the input signal s[t] has a component of the noise-likeness, and a noise-likeness signal Noise denoting the noise-likeness is output. Also, a noise spectrum updating rate coefficient r corresponding to the noise-likeness signal Noise is output.

In the same manner as in the prior art, in the noise spectrum estimating unit 4, a noise spectrum N[f] is updated according to the noise spectrum updating rate coefficient r output from the noise-likeness analyzing unit 3, the amplitude spectrum S[f] output from the time-to-frequency converting unit 2 and an average noise spectrum Nold[f] of preceding noise spectrums N[f] held inside, and the noise spectrum N[f] is output.

Also, in the same manner as in the prior art, in the frequency band signal-to-noise ratio calculating unit 5, a frequency band SN ratio SNR[f] is calculated according to the amplitude spectrum S[f] output from the time-to-frequency converting unit 2 and the noise spectrum N[f] output from the noise spectrum estimating unit 4 for each frequency band f.

In the amplitude suppression quantity calculating unit 20, an amplitude suppression quantity min_gain denoting a noise suppression level of a current frame is calculated from both the noise-likeness signal Noise output from the noise-likeness analyzing unit 3 and the noise spectrum N[f] output from the noise spectrum estimating unit 4. In detail, a power of the noise spectrum N[f] is calculated in the amplitude suppression quantity calculating unit 20 according to an equation (8), and a noise power Npow of a current frame is obtained. Here, fc in the equation (8) denotes a Nyquist frequency.

$$N\text{pow}=10\times\log 10(\Sigma N[f]), f=0, \ldots, \text{fc} \tag{8}$$

Thereafter, in the amplitude suppression quantity calculating unit 20, the noise power Npow obtained according to the equation (8) is compared with a maximum amplitude suppression quantity MIN_GAIN denoting a prescribed constant. In a case where the noise power Npow is higher than the maximum amplitude suppression quantity MIN_GAIN, the amplitude suppression quantity min_gain is limited to the maximum amplitude suppression quantity MIN_GAIN. Here, in a case where the maximum amplitude suppression quantity MIN_GAIN is, for example, set to a comparatively low value of 10 dB or the like, the amplitude suppression quantity min_gain is set to the maximum amplitude suppression quantity MIN_GAIN except a case where Npow<MIN_GAIN is satisfied in an equation (9) (that is, a case where noises are hardly superimposed on the input signal s[t]). In short, in a case where noises are superimposed on the input signal s[t], the amplitude suppression quantity min_gain is fixed to the maximum amplitude suppression quantity MIN_GAIN. Also, in a case where noises are hardly superimposed on the input signal s[t], the amplitude suppression quantity min_gain is set to the noise power Npow.

$$\begin{aligned}\text{min\_gain} &= \text{MIN\_GAIN} \quad (\text{dB}); \quad Npow < \text{MIN\_GAIN} \\ &= Npow \quad (\text{dB}); \quad \text{other cases}\end{aligned} \tag{9}$$

In the perceptual weight pattern adjusting unit 21, a perceptual weight distributing pattern min_gain_pat[f], which denotes a frequency characteristic distributing pattern of both a spectral subtraction quantity α[f] denoting a first perceptual weight and a spectral amplitude suppression quantity β[f] denoting a second perceptual weight, is determined according to the amplitude suppression quantity min_gain obtained according to the equation (9), the noise-likeness signal Noise output from noise-likeness analyzing unit 3 and a perceptual weight basic distributing pattern MIN_GAIN_PAT[i][f] denoting a basis of a perceptual weight distributing pattern which decides both a range of the spectral subtraction quantity α[f] denoting the first perceptual weight and a range of the spectral amplitude suppression quantity β[f] denoting the second perceptual weight, and the perceptual weight distributing pattern min_gain_pat [f] is output.

Figure 5:
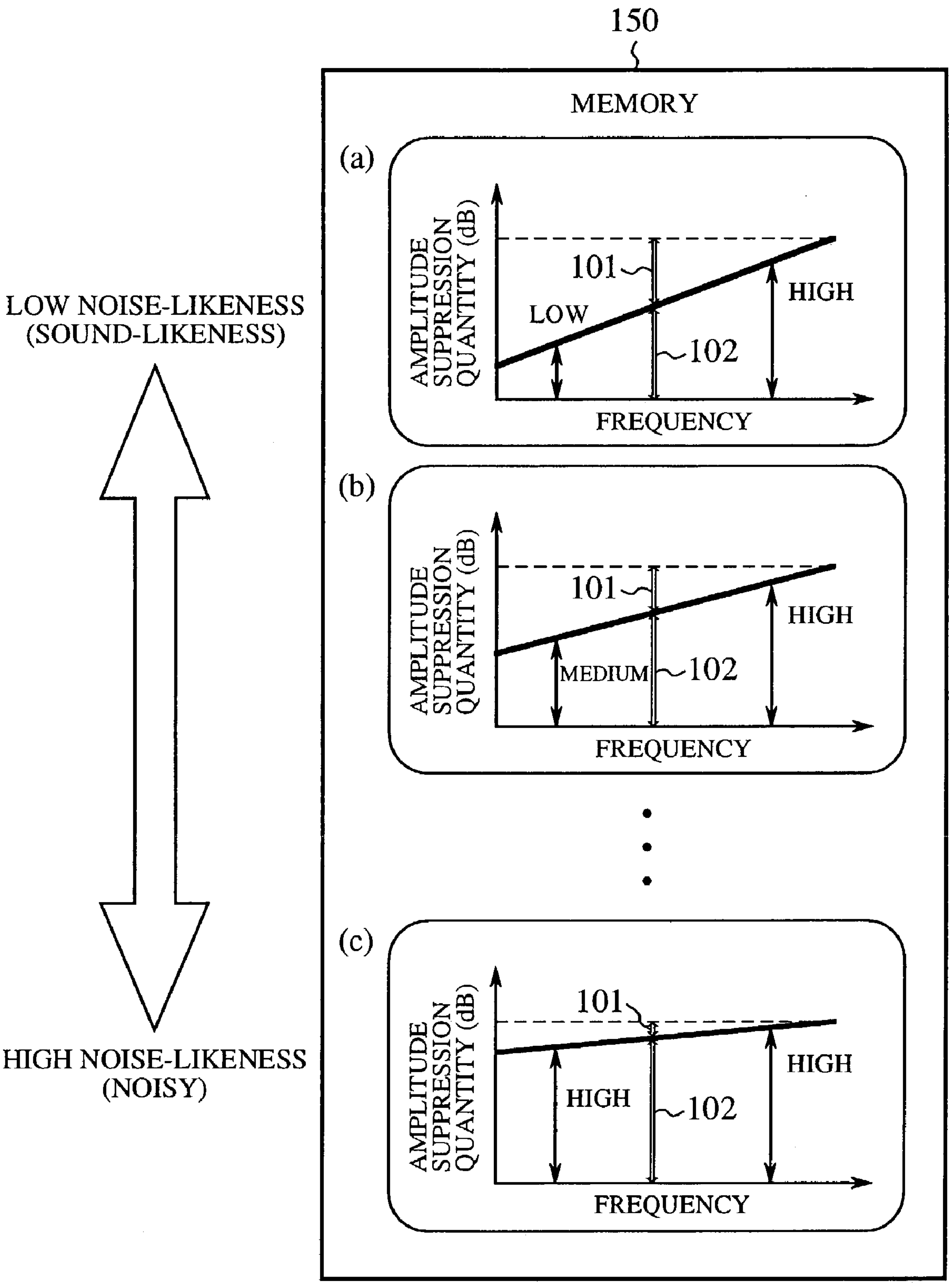
FIG. 5 is a view showing an example of a perceptual weight basic distributing pattern in the noise suppressing apparatus of the first embodiment of the present invention.

FIG. 5 is a view showing an example of the perceptual weight basic distributing pattern MIN_GAIN_PAT[i][f] used to determine the perceptual weight distributing pattern min_gain_pat[f]. Here, "i" changes with the value of the noise-likeness signal Noise, and i=0 to 4 is satisfied as an example. In FIG. 5, 101 indicates the spectral subtraction quantity [αc]∝[f], 102 indicates the spectral amplitude suppression quantity [βc]β[f], and 150 indicates a memory. As shown in FIG. 5, a plurality of amplitude suppression quantities having various frequency characteristics respectively corresponding to values of the noise-likeness signal Noise are prepared as a plurality of perceptual weight basic distributing patterns MIN_GAIN_PAT[i][f], the amplitude suppression quantities are stored in a memory (not shown) of the perceptual weight pattern adjusting unit 21 such as a ROM table or the like, and one perceptual weight basic distributing pattern MIN_GAIN_PAT[Noise][f] corresponding to the noise-likeness signal Noise output from the noise-likeness analyzing unit 3 is output from the memory.

Thereafter, in the perceptual weight pattern adjusting unit 21, a perceptual weight distributing pattern min_gain_pat[f] denoting a frequency characteristic distributing pattern of both the spectral subtraction quantity α[f] denoting the first perceptual weight and the spectral amplitude suppression quantity β[f] denoting the second perceptual weight is determined according to an equation (10) by multiplying the perceptual weight basic distributing pattern MIN_GAIN_PAT[Noise][f] corresponding to the noise-likeness signal Noise by the amplitude suppression quantity min_gain output from the amplitude suppression quantity calculating unit 20, and the perceptual weight distributing pattern min_gain_pat[f] is output.

$$\text{min\_gain\_pat}[f]=\text{min\_gain}\times\text{MIN\_GAIN\_PAT[Noise]}[f] \tag{10}$$

In the perceptual weight correcting unit 7, a corrected spectral subtraction quantity αc[f] denoting a first corrected perceptual weight and a corrected spectral amplitude suppression quantity βc[f] denoting a second corrected perceptual weight given by the perceptual weight distributing pattern min_gain_pat[f] are determined according to following equations (11), (12) and (13) by using both the frequency band SN ratio SNR[f] output from the frequency band signal-to-noise ratio calculating unit 5 and the perceptual weight distributing pattern min_gain_pat[f] obtained in the perceptual weight pattern adjusting unit 21 according to the equation (10).

In detail, in the perceptual weight correcting unit 7, the frequency band SN ratio SNR[f] is stabilized according to the following equation (11), and a stabilized frequency band SN ratio SNRlim[f] is obtained. In the equation (11), SNR_THLD[f] denotes a prescribed constant threshold value. In a case where the frequency band SN ration SNR[f] is considerably low, the spectral amplitude suppression quantity βc[f] of the equation (12) described later is set to be a constant value by the threshold value SNR_THLD[f] and is stabilized to a value of the perceptual weight distributing pattern min_gain_pat[f].

$$\begin{aligned}SNR\text{lim}[f] &= \text{SNR\_THLD}[f]; \quad SNR[f] < \text{SNR\_THLD}[f] \\ &= SNR[f]; \quad \text{other cases}\end{aligned} \tag{11}$$

Thereafter, in the perceptual weight correcting unit 7, the corrected spectral amplitude suppression quantity βc[f] is calculated according to the following equation (12). In the equation (12), GAIN[f] denotes a prescribed constant. The constant GAIN[f] is set to be increased as the frequency f approaches a high frequency band, and the corrected spectral subtraction quantity αc[f] and the corrected spectral amplitude suppression quantity βc[f] are sensibly changed with SNR[f] as the frequency f is heightened. Therefore, the constant GAIN[f] denotes an acceleration factor. In the equation (12), as the frequency band SN ratio SNR[f] is heightened, a value of a first term ((SNRlim[f]−SNR_THLD[f])×GAIN[f]) of the equation (12) is heightened. In a case where the value of the first term (a positive value in case of SNRlim[f]>SNR_THLD[f]) is lower than that of a second term (min_gain_pat[f]) of the equation (12), the corrected spectral amplitude suppression quantity βc[f] is set to a negative value. However, as the value of the first term is increased, the absolute value of the corrected spectral amplitude suppression quantity βc[f] is lowered. Therefore, a negative gain is lowered. That is, the amplitude suppression is weakened. In contrast, in a case where the band frequency SN ratio SNR[f] is lowered, the corrected spectral amplitude suppression quantity βc[f] is heightened. Therefore, a negative gain is heightened. That is, the amplitude suppression is strengthened. Here, in a case where the corrected spectral amplitude suppression quantity βc[f] exceeds 0 (dB), the corrected spectral amplitude suppression quantity βc[f] is limited to 0 (dB), and no amplitude suppression is performed. Also, in a case where the band frequency SN ratio SNR[f] is lower than the threshold value SNR_THLD[f], because the stabilized frequency band SN ratio SNRlim[f] is limited to the threshold value SNR_THLD[f] according to the equation (11), the corrected spectral amplitude suppression quantity βc[f] is constant and is set to the perceptual weight distributing pattern min_gain_pat[f].

$$\beta c[f] = (SNR\text{lim}[f] - \text{SNR\_THLD}[f]) \times GAIN[f]) - \text{min\_gain\_pat}[f] \qquad (12)$$
$$= 0(\text{dB}); \quad \beta c[f] > 0$$

In the perceptual weight correcting unit 7, after the corrected spectral amplitude suppression quantity βc[f] is calculated in the equation (12), the corrected spectral subtraction quantity αc[f] is calculated according to the following equation (13) by using the corrected spectral amplitude suppression quantity βc[f].

$$\alpha c[f] = \text{min\_gain} - \beta c[f] \qquad (13)$$

In the example shown in FIG. 5, in a case where the noise-likeness of the noise-likeness signal Noise is lowest (in case of Noise=3, 4), a rate of the spectral subtraction is highest in the low frequency band. As the noise-likeness is increased (Noise=2, 1), a rate of the spectral subtraction in the low frequency band is lowered, and a rate of the spectral amplitude suppression is relatively increased. Here, a view (a) of FIG. 5 shows a case of Noise=3 or 4. A view (b) of FIG. 5 shows a case of Noise=2. A view (c) of FIG. 5 shows a case of Noise=0. Therefore, in a case where the noise-likeness is low (that is, in a case where the probability of a voiced sound is high), because an average SN ratio in all frequency bands of the current frame is high, a large noise suppression quantity can be obtained due to the spectral subtraction. In contrast, in a case where the noise-likeness is high (that is, in a case where the probability of noises is high), because an average SN ratio in all frequency bands of the current frame is low, a rate of the spectral subtraction is lowered. Therefore, a rate of the spectral amplitude suppression is relatively heightened, and the deformation of the spectrum can be prevented.

Figure 6A:
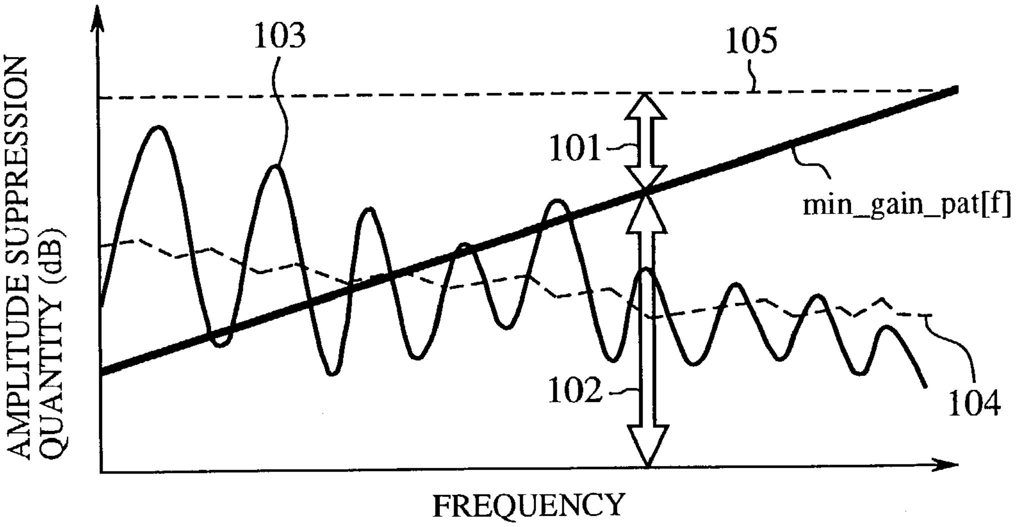
FIG. 6A, FIG. 6B and FIG. 6C are views respectively showing an example of the adjustment of a distributing pattern of a spectral subtraction quantity or a spectral amplitude suppression quantity in the noise suppressing apparatus of the first embodiment of the present invention.
Figure 6B:
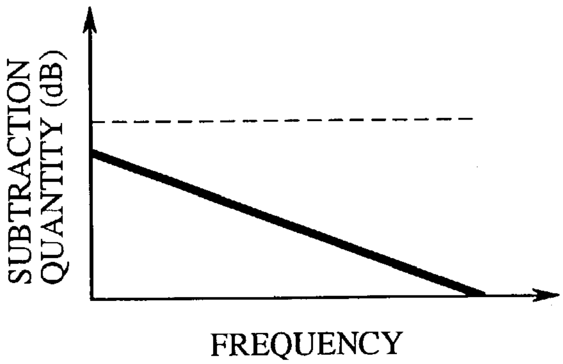
Figure 6C:
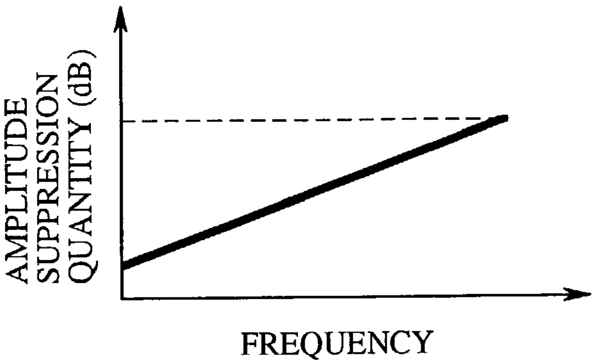

FIG. 6A is a view showing an example of the adjustment of a distributing pattern of both the corrected spectral subtraction quantity αc[f] denoting the first corrected perceptual weight and the corrected spectral amplitude suppression quantity βc[f] denoting the second corrected perceptual weight in a case where the noise-likeness signal Noise=4 and the amplitude suppression quantity min_gain=10 dB are satisfied. In FIG. 6A, 103 indicates a speech spectrum, 104 indicates a noise spectrum, and 105 indicates min_gain=10 dB. The constituent elements, which are the same as those shown in FIG. 5, are indicated by the same reference numerals as those of the constituent elements shown in FIG. 5, and additional description of those constituent elements is omitted. Also, FIG. 6B shows a range in which the corrected spectral subtraction quantity αc[f] can be corrected by using an assigned SN ratio, and FIG. 6C shows a range in which the corrected spectral amplitude suppression quantity βc[f] can be corrected by using an assigned SN ratio. In the example of FIG. 6A, in the same manner as in the control of both spectral subtraction quantity and the amplitude suppression quantity shown in FIG. 3 of the prior art, a rate of the spectral subtraction described later is high in the low frequency band, and a rate of the spectral amplitude suppression described later is increased as the frequency r is heightened. However, the control in the first embodiment differs from the control in the prior art shown in FIG. 3 in that none of the corrected spectral subtraction quantity αc[f] and the corrected spectral amplitude suppression quantity βc[f] is increased to a value exceeding the perceptual weight distributing pattern min_gain_pat[f] shown in FIG. 6A.

That is, a total noise suppression quantity based on both the corrected spectral subtraction quantity αc[f] and the corrected spectral amplitude suppression quantity βc[f] is set to the amplitude suppression quantity min_gain of a constant value. Therefore, the excessive spectral subtraction and the excessive spectral amplitude suppression can be prevented, the amplitude suppression quantity between frames can be constant, and the feeling of the discontinuity among frames can be reduced.

In the spectrum subtracting unit 8, according to a following equation (14), a spectrum is obtained by multiplying the noise spectrum N[f] by the corrected spectral subtraction quantity αc[f], the spectrum is subtracted from the amplitude spectrum S[f] to obtain a noise subtracted spectrum Ss[f], and the noise subtracted spectrum Ss[f] is output. In a case where the noise subtracted spectrum Ss[f] is negative, the amplitude suppression quantity min_gain (dB) output from the amplitude suppression quantity calculating unit 20 is converted into a linear value min_gain_lin, and the back filling processing is performed by setting a product, which is obtained by multiplying the amplitude spectrum S[f] by the linear value min_gain_lin, as a noise subtracted spectrum Ss[f].

$$Ss[f] = S[f] - \alpha c[f] \times N[f]; \quad S[f] > \alpha c[f] \times N[f] \qquad (14)$$
$$= S[f] \times \text{min\_gain\_lin}; \quad \text{other cases}$$

In the spectrum suppressing unit 9, the corrected spectral amplitude suppression quantity βc[f] calculated according to the equation (12) is converted into a linear value β_l[f], the noise subtracted spectrum Ss[f] is multiplied by the spectral amplitude suppression quantity β_l[f] according to a following equation (15), and a noise suppressed spectrum Sr[f] is output.

$$Sr[f]=\beta\_1[f]\times Ss[f] \quad (15)$$

In the frequency-to-time converting unit 10, the noise suppressed spectrum Sr[f] is converted into a time signal according to the phase spectrum P[f] output from the time-to-frequency converting unit 2, a portion of a time signal of a preceding frame is superimposed on the time signal of the current frame, and a noise suppressed signal sr[t] is output from the output terminal 11.

As is described above, in the first embodiment, as shown in FIG. 6A to FIG. 6C and formulated in the equation (13), because the value of the corrected spectral subtraction quantity αc[f] denoting the first corrected perceptual weight is determined according to the value of the corrected spectral amplitude suppression quantity βc[f] denoting the second corrected perceptual weight, the total noise suppression quantity based on both the corrected spectral subtraction quantity αc[f] and the corrected spectral amplitude suppression quantity βc[f] is set to the amplitude suppression quantity min_gain of a constant value. Therefore, because the noise suppressed signal sr[t] output after the noise suppression is stabilized in the time direction, noises can be preferably suppressed with respect to the feeling in the hearing sensation, and the noise suppression can be performed even in a high noise circumstance while lowering the deterioration of a speech quality.

For example, in a case where the spectral amplitude suppression using the corrected spectral amplitude suppression quantity βc[f] is performed to a whole degree of the amplitude suppression quantity min_gain, the spectral subtraction based on the corrected spectral subtraction quantity αc[f] is not performed. Therefore, a total noise suppression quantity can be constant for each frame.

Also, in the first embodiment, though the value of the SN ratio depends on the shape of the noise spectrum, because the voiced sound has a major component in the low frequency band, the SN ratio is generally heightened in the low frequency band. Therefore, as shown in FIG. 6A, a rate of the corrected spectral subtraction quantity αc[f] denoting the first corrected perceptual weight in the perceptual weight distributing pattern min_gain_pat[f] is heightened in the low frequency band, a rate of the corrected spectral subtraction quantity αc[f] in the perceptual weight distributing pattern min_gain_pat[f] is decreased as the frequency approaches the high frequency band, and the noises are largely subtracted in the low frequency band of a high SN ratio. Accordingly, noises having a major component in the low frequency band and generated in the running of a motor vehicle can be effectively suppressed. Also, because the subtraction quantity is reduced in the high frequency band of a low SN ratio, an excess subtraction of the spectrum can be prevented, and the deformation of the speech spectrum of components of the high frequency band can be prevented.

Also, in the first embodiment, as shown in FIG. 6A to FIG. 6C, a rate of the spectral amplitude suppression based on the corrected spectral amplitude suppression quantity βc[f] denoting the second corrected perceptual weight is reduced in the low frequency band of a high SN ratio, and a rate of the spectral amplitude suppression is increased as the frequency approaches the high frequency band of a low SN ratio. Therefore, a high frequency residual noise not sufficiently removed in the spectral subtraction processing from the speech signal, on which noises having a major component in the low frequency band and generated in the running of a motor vehicle are superimposed, can be suppressed.

Also, in the first embodiment, the perceptual weight basic distributing pattern MIN_GAIN_PAT[i][f] denoting both the first perceptual weight and the second perceptual weight is, for example, selected from a plurality of frequency characteristics shown in FIG. 5 according to the noise-likeness signal Noise. Therefore, in a case where the noise-likeness indicated by the noise-likeness signal Noise is small, a rate of the spectral subtraction is heightened in the low frequency band. Therefore, a high noise suppression quantity can be obtained. Also, a rate of the spectral subtraction is reduced in the low frequency band as the noise-likeness is increased. Accordingly, the deformation of the spectrum can be prevented.

EMBODIMENT 2

A block diagram showing the configuration of a noise suppressing apparatus according to a second embodiment of the present invention is the same as that shown in FIG. 4 of the first embodiment. In this embodiment, the perceptual weight basic distributing pattern MIN_GAIN_PAT[i][f] shown in FIG. 5 of the first embodiment is arbitrarily changed according to the use circumstance.

Next, an operation will be described below.

An average frequency characteristic of the noise spectrum N[f] or a distribution of the frequency band SN ratio corresponding to a use circumstance is, for example, examined in advance, and the perceptual weight basic distributing pattern MIN_GAIN_PAT[i][f] is corrected. Or the optimum learning for the perceptual weight basic distributing pattern MIN_GAIN_PAT[l][f] is performed according to input signal data obtained from the use circumstance. Thereafter, the perceptual weight basic distributing pattern MIN_GAIN_PAT[i][f] is adapted to the use circumstance.

As is described above, in the second embodiment, because the perceptual weight basic distributing pattern MIN_GAIN_PAT[i][f] is arbitrarily changed according to the use circumstance, the accuracy of the corrected spectral subtraction quantity αc[f] and the corrected spectral amplitude suppression quantity βc[f] can be heightened, and the noise suppression can be performed while further reducing the deterioration of a speech quality.

EMBODIMENT 3

Figure 7:
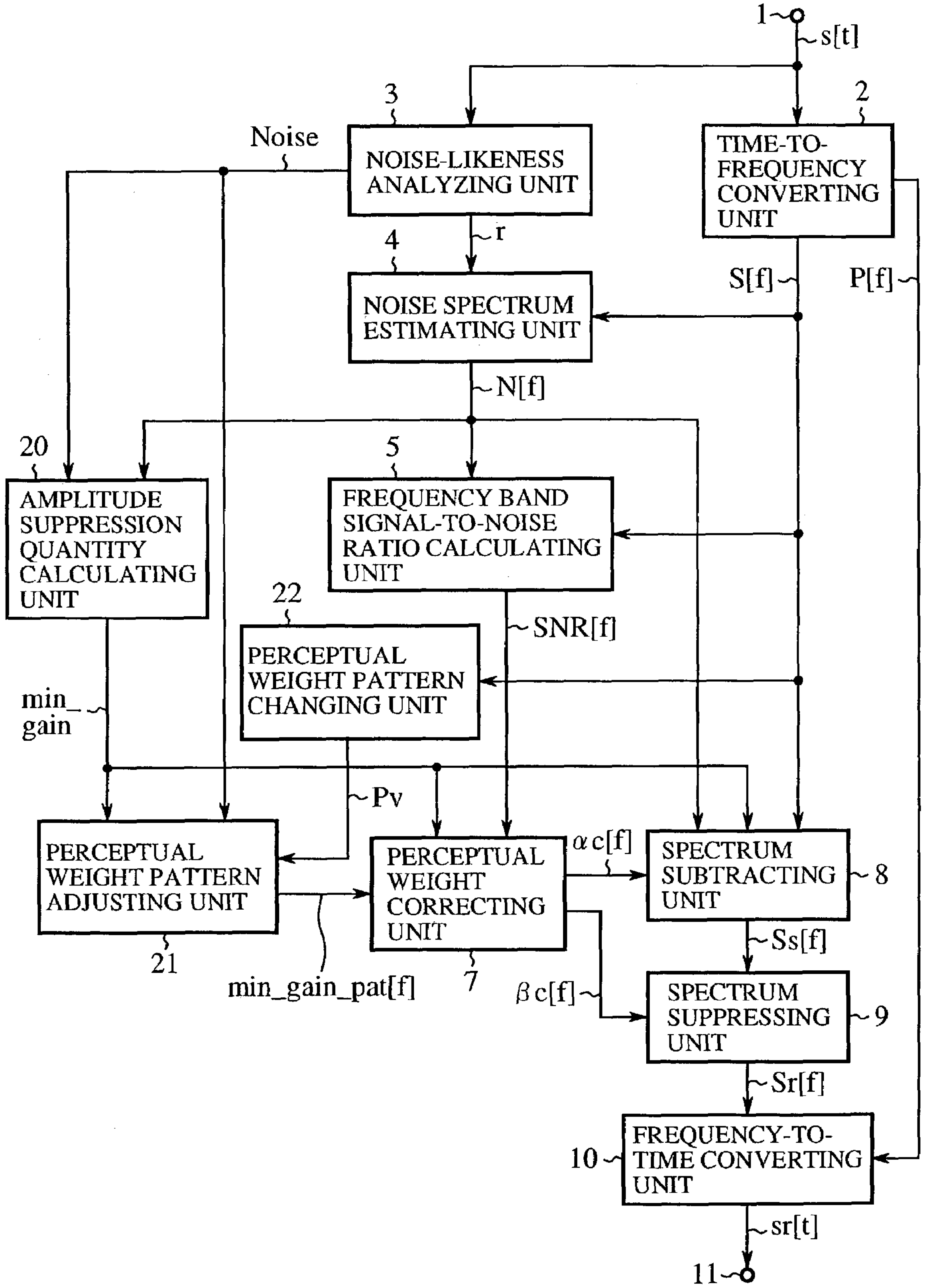
FIG. 7 is a block diagram showing the configuration of a noise suppressing apparatus according to a third embodiment of the present invention.

FIG. 7 is a block diagram showing the configuration of a noise suppressing apparatus according to a third embodiment of the present invention. In FIG. 7, 22 indicates a perceptual weight pattern changing unit for calculating a ratio of a high frequency band power of the amplitude spectrum S[f] to a low frequency band power of the amplitude spectrum S[f]. The other configuration is the same as that shown in FIG. 5, and additional description of the other configuration is omitted. In the third embodiment, the amplitude spectrum S[f] obtained from the input signal of the current frame is divided into a spectrum of a low frequency band and a spectrum of a high frequency band in a speech time period, a high frequency band power of the amplitude spectrum S[f] and a low frequency band power of the amplitude spectrum S[f] are calculated, and a perceptual weight distributing pattern min_gain_pat[f] of both the first perceptual weight and the second perceptual weight is changed according to the ratio of the high frequency band power to the low frequency band power. Next, an operation will be described below.

In the perceptual weight pattern changing unit 22, as is formulated in a following equation (16), a group of samples from a 0-th point to a 63-th point of the amplitude spectrum S[f] output from the time-to-frequency converting unit 2 is set as a low frequency spectrum, a group of samples from a 64-th point to a 127-th point of the amplitude spectrum S[f] is set as a high frequency spectrum, a low frequency band power Pow_l and a high frequency band power Pow_h are calculated from the amplitude spectrum S[f], a high-to-low frequency band power ratio Pv is calculated from the low frequency band power Pow_l and the high frequency band power Pow_h, and the high-to-low frequency band power ratio Pv is output. Here, in a case where the high-to-low frequency band power ratio Pv is higher than a prescribed upper limit threshold value Pv_H, the power ratio Pv is limited to the threshold value Pv_H. In a case where the high-to-low frequency band power ratio Pv is lower than a prescribed lower limit threshold value Pv_L, the power ratio Pv is limited to the threshold value Pv_L.

$$Pow\_l=\Sigma S[f];\ f=0, \ldots, 63$$

$$Pow\_h=\Sigma S[f];\ f=64, \ldots, 127$$

$$Pv=Pow\_h/Pow\_l$$

$$\text{Here, } Pv=Pv\_H;\ Pv>Pv\_H$$

$$Pv=Pv\_L;\ Pv<Pv\_L \quad (16)$$

In the perceptual weight pattern adjusting unit 21, as is formulated in a following equation (17), a perceptual weight distributing pattern min_gain_pat[f] of both the spectral subtraction quantity α[f] denoting the first perceptual weight and the spectral amplitude suppression quantity β[f] denoting the second perceptual weight is determined according to the amplitude suppression quantity min_gain output from the amplitude suppression quantity calculating unit 20, the noise-likeness signal Noise output from the noise-likeness analyzing unit 3 and the high-to-low frequency band power ratio Pv output from the perceptual weight pattern changing unit 22. Here, in the equation (17), MIN_GAIN_PAT[Noise][f] denotes a basic distributing pattern selected according to the noise-likeness signal Noise, and Pv_inv denotes an inverted value of the high-to-low frequency band power ratio Pv obtained according to the equation (16). Also, in a case where the perceptual weight distributing pattern min_gain_pat[f] is higher than the amplitude suppression quantity min_gain, the value of the perceptual weight distributing pattern min_gain_pat[f] is limited to the amplitude suppression quantity min_gain. Also, fc in the equation (17) indicates a Nyquist frequency.

$$min\_gain\_pat[f]=min\_gain\times MIN\_GAIN\_PAT[Noise][f]\times(1.0\times(fc-f)+Pv\_inv\times f)/fc$$

$$\text{Here, } Pv\_inv=1.0/Pv \quad min\_gain\_pat[f]=min\_gain;\ min\_gain\_pat[f]>min\_gain \quad (17)$$

Figure 8A:
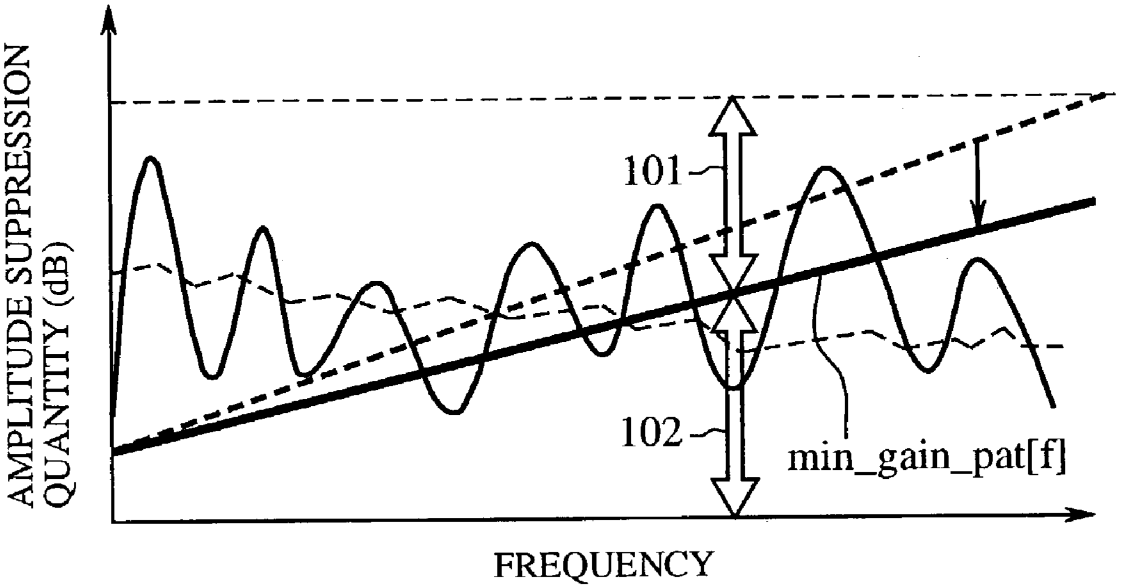
FIG. 8A and FIG. 8B are views respectively showing an example of a control method of the change of a perceptual weight distributing pattern in the noise suppressing apparatus of the third embodiment of the present invention
Figure 8B:
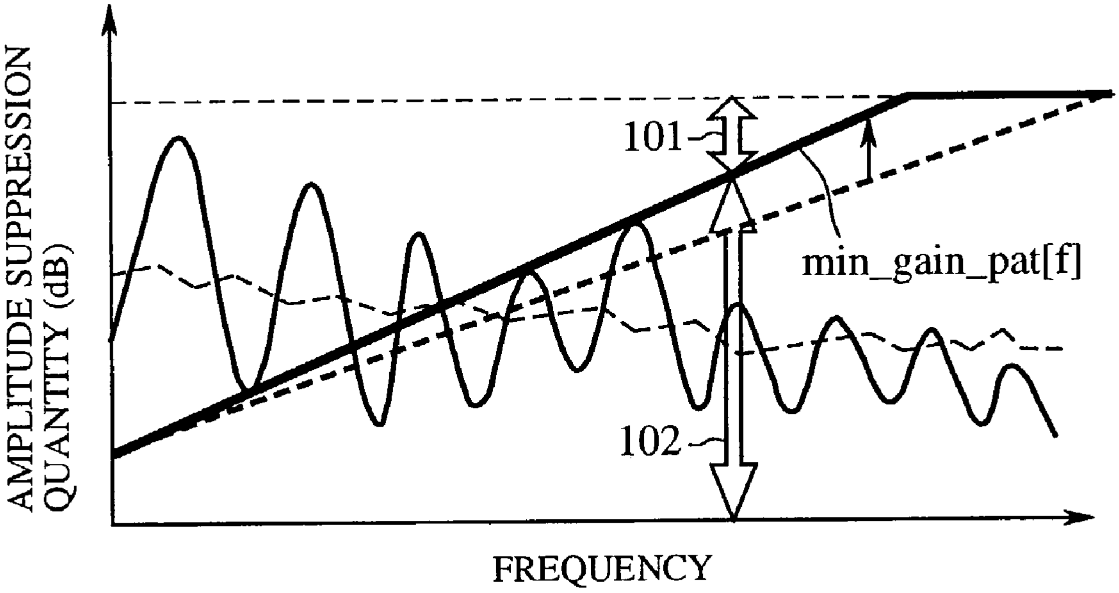

FIG. 8A and FIG. 8B are views respectively showing an example of a control method of the change of a perceptual weight distributing pattern and show image views in a case where the perceptual weight distributing pattern min_gain_pat[f] of both the first perceptual weight and the second perceptual weight is changed. FIG. 8A corresponds to a case of the high frequency band power Pow_h higher than the low frequency band power Pow_l, and FIG. 8B corresponds to a case of the low frequency band power Pow_l higher than the high frequency band power Pow_h. The constituent elements, which are the same as those shown in FIG. 5, are indicated by the same reference numerals as those of the constituent elements shown in FIG. 5, and additional description of those constituent elements is omitted.

In a case where the high frequency band power Pow_h is higher than the low frequency band power Pow_l, the SN ratio in the high frequency band is generally heightened. Therefore, as shown in FIG. 8A, the inclination of the perceptual weight distributing pattern min_gain_pat[f] is gently changed, and a rate of the spectral subtraction of a higher frequency band is heightened. In contrast, in a case the low frequency band power Pow_l is higher than the high frequency band power Pow_h, the SN ratio in the low frequency band is heightened. Therefore, as shown in FIG. 8B, the inclination of the perceptual weight distributing pattern min_gain_pat[f] is steeply changed, and a rate of the spectral amplitude suppression of the high frequency band is heightened.

As is described above, in the third embodiment, many components of the speech signal are included in the amplitude spectrum S[f] of the input signal in the speech time period, and the perceptual weight distributing pattern min_gain_pat[f] is changed according to the amplitude spectrum S[f]. Therefore, the perceptual weight distributing pattern min_gain_pat[f] can be adapted to the shape of the spectrum in the speech time period. Also, because both the spectral subtraction and the spectral amplitude suppression adapted to the frequency characteristic of the speech signal are performed, the noise suppression preferable for the feeling in the hearing sensation can be performed.

EMBODIMENT 4

Figure 9:
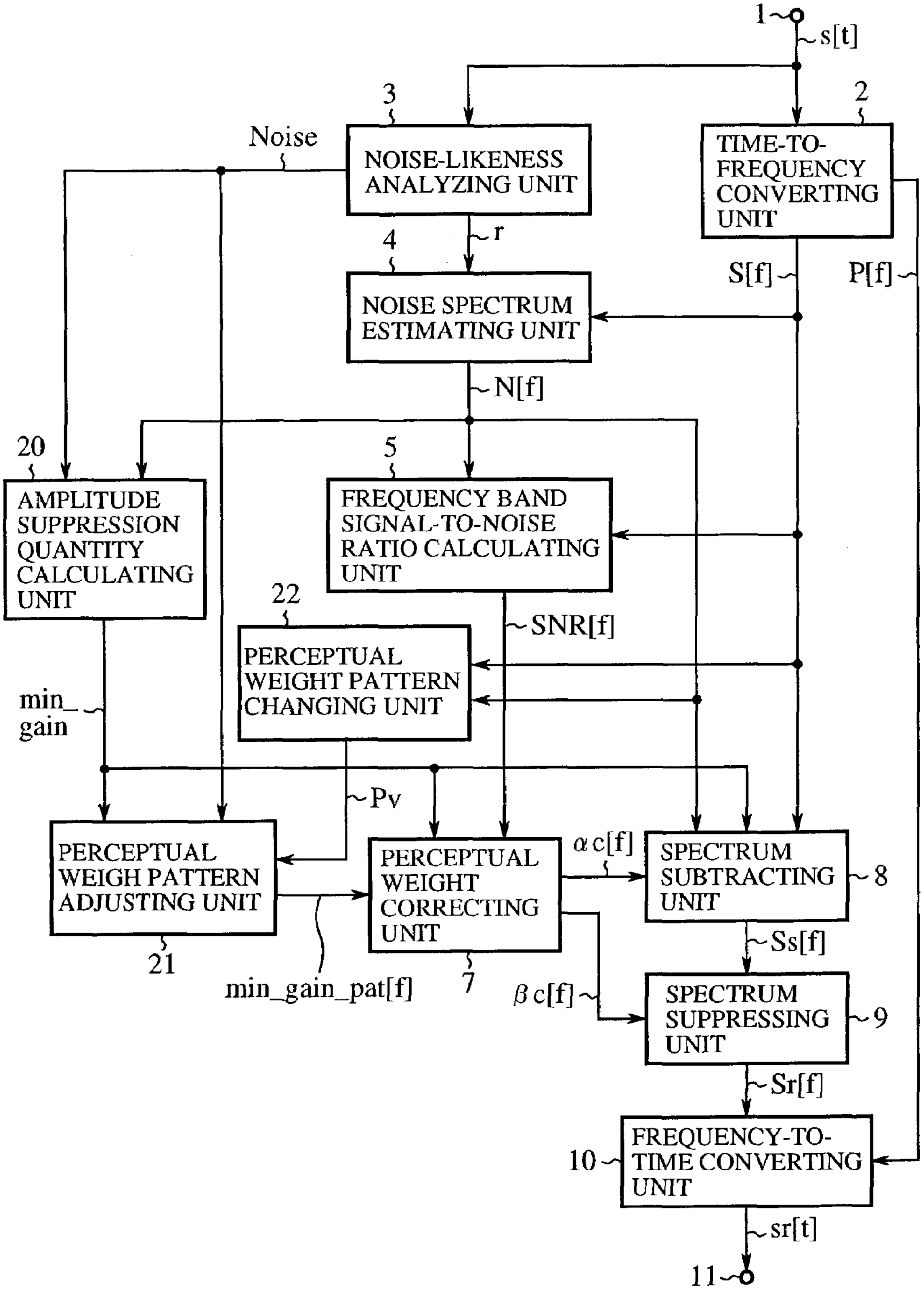
FIG. 9 is a block diagram showing the configuration of a noise suppressing apparatus according to a fourth embodiment of the present invention.

FIG. 9 is a block diagram showing the configuration of a noise suppressing apparatus according to a fourth embodiment of the present invention. In FIG. 9, 22 indicates a perceptual weight pattern changing unit for calculating a ratio of a high frequency band power of the noise spectrum N[f] to a low frequency band power of the noise spectrum N[f] in a noise time period. The other configuration is the same as that shown in FIG. 7 of the third embodiment. In this embodiment, in place of the amplitude spectrum S[f], the noise spectrum N[f] is divided into a spectrum of a low frequency band and a spectrum of a high frequency band in the noise time period to obtain a low frequency band power Pow_l and a high frequency band power Pow_h, and a perceptual weight distributing pattern min_gain_pat[f] of both the first perceptual weight and the second perceptual weight is changed according to a ratio Pv of the high frequency band power Pow_h to the low frequency band power Pow_l.

Next, an operation will be described below.

In a noise time period, because the amplitude spectrum S[f] of the input signal is considerably changed with time and frequency, it is improper to change the perceptual weight distributing pattern min_gain_pat[f] according to the amplitude spectrum S[f] of an unstable input signal. Therefore, in the perceptual weight pattern adjusting unit 21, the perceptual weight distributing pattern min_gain_pat[f] is changed according to the noise spectrum N[f] stable in both the time direction and the frequency direction.

As is described, in the fourth embodiment, the perceptual weight distributing pattern min_gain_pat[f] of both the first perceptual weight and the second perceptual weight is changed according to the ratio Pv of the high frequency band power Pow_h to the low frequency band power Pow_l of the noise spectrum N[f] stable in both the time direction and the frequency direction. Therefore, the perceptual weight distributing pattern min_gain_pat[f] can be stably adapted to an average shape of the spectrum in the noise time period. Also, both the spectral subtraction and the spectral amplitude suppression adapted to the frequency characteristic of the noise time period are performed. Therefore, the noise suppression further preferable for the feeling in the hearing sensation can be performed.

EMBODIMENT 5

Figure 10:
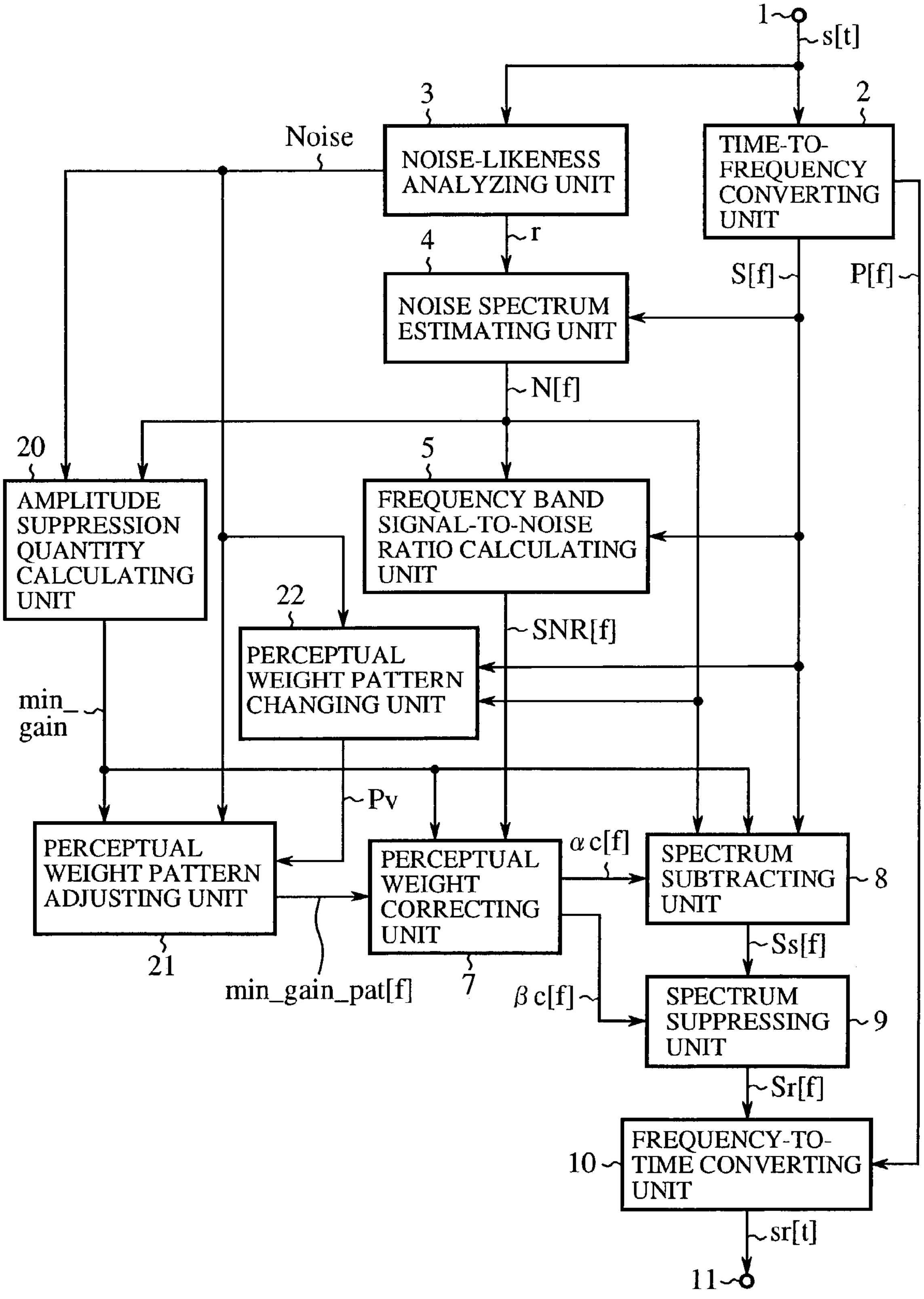
FIG. 10 is a block diagram showing the configuration of a noise suppressing apparatus according to a fifth embodiment of the present invention.

FIG. 10 is a block diagram showing the configuration of a noise suppressing apparatus according to a fifth embodiment of the present invention. In FIG. 10, 22 indicates a perceptual weight pattern changing unit for calculating a ratio of a high frequency band power to a low frequency band power in an average spectrum A(f) obtained from a weighted average of both the amplitude spectrum S[f] and the noise spectrum N[f] according to the noise-likeness signal Noise in a transitional time period of the voice such as consonant. The other configuration is the same as that shown in FIG. 9 of the fourth embodiment. In this embodiment, in place of the amplitude spectrum S[f], an average spectrum A(f) obtained from a weighted average of both the amplitude spectrum S[f] and the noise spectrum N[f] is divided into a spectrum of a low frequency band and a spectrum of a high frequency band in the transitional time period of the voice such as consonant, a low frequency band power Pow_l and a high frequency band power Pow_h of the average spectrum A(f) are obtained, and a perceptual weight distributing pattern min_gain_pat[f] of both the first perceptual weight and the second perceptual weight is changed according to a ratio Pv of the high frequency band power Pow_h to the low frequency band power Pow_l.

Next, an operation will be described below.

Figure 1:
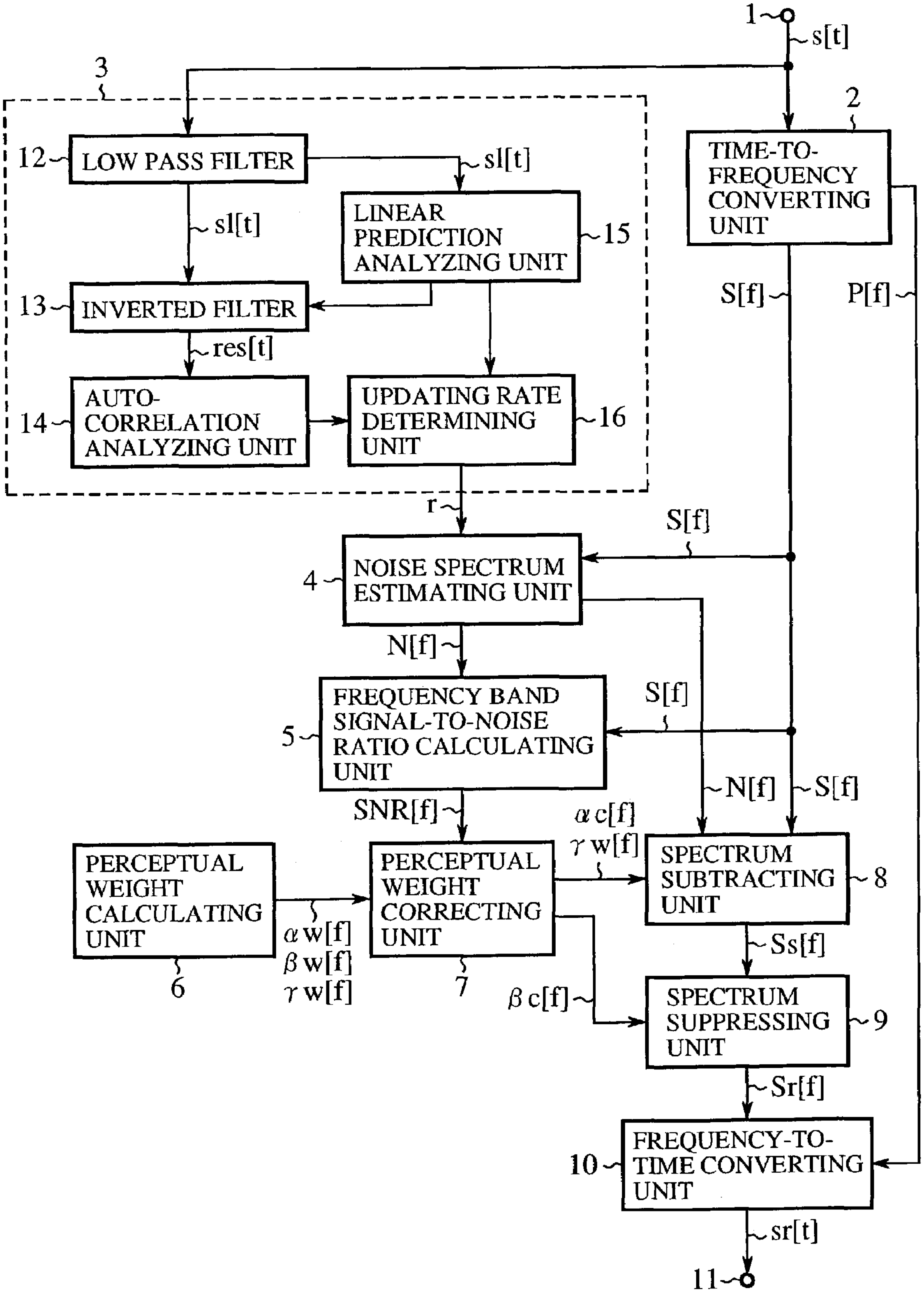
FIG. 1 is a block diagram showing the configuration of a conventional noise suppressing apparatus.
Figures 2, 3:
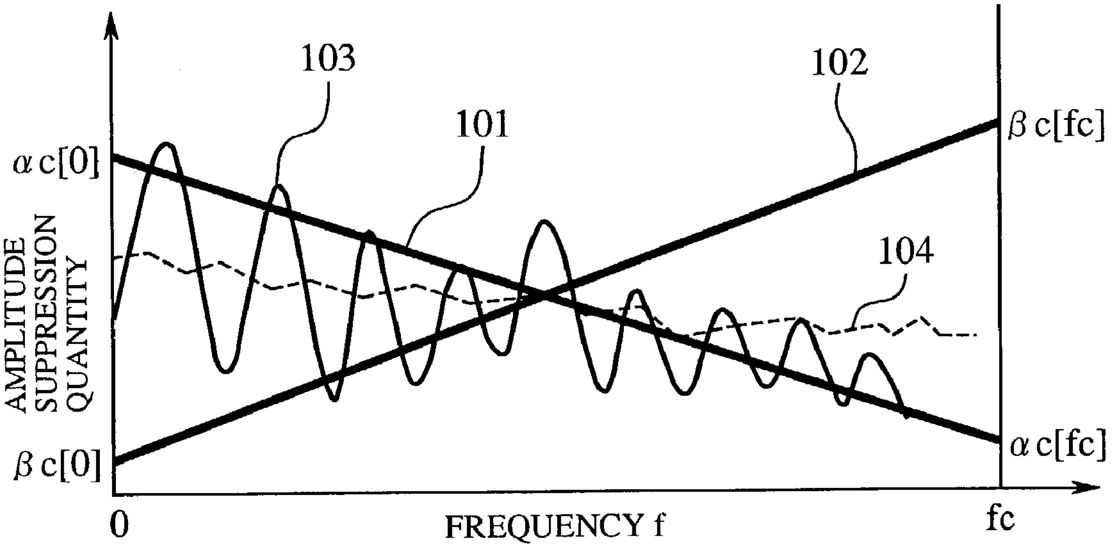
FIG. 2 is a view showing the relation between a noise-likeness signal Noise and a noise spectrum updating rate coefficient r.
FIG. 3 is a view showing an example of the control for both spectral subtraction and spectral amplitude suppression.

In the perceptual weight pattern changing unit 22, the amplitude spectrum S[f] composed of 128-point samples output from the time-to-frequency converting unit 2 and the noise spectrum N[f] output from the noise spectrum estimating unit 4 are received, and an average spectrum A[f] is calculated according to a following equation (18). Here, Cn in the equation (18) indicates a prescribed weighting factor, for example, determined according to the state of the noise-likeness signal Noise shown in FIG. 2. In a case where the noise-likeness signal Noise shown in FIG. 2 is ranged from zero to two, there is a high probability that the current frame is placed in the noise time period. Therefore, Cn=0.7 is set, and the noise spectrum N[f] is weighted. In contrast, in a case where the noise-likeness signal Noise is ranged from three to four, there is a high probability that the current frame is placed in the speech time period. Therefore, Cn=0.3 is set, and the amplitude spectrum S[f] of the input signal is weighted.

$$A[f]=(1-Cn)\times S[f]+Cn\times N[f] \qquad (18)$$

In the perceptual weight pattern changing unit 22, as is formulated in a following equation (19), a group of samples from a 0-th point to a 63-th point of the average spectrum A[f] obtained according to the equation (18) is set as a low frequency spectrum, a group of samples from a 64-th point to a 127-th point of the average spectrum A[f] is set as a high frequency spectrum, and a low frequency band power Pow_l and a high frequency band power Pow_h are calculated from the average spectrum A[f]. Thereafter, in the perceptual weight pattern changing unit 22, a high-to-low frequency band power ratio Pv is calculated from the low frequency band power Pow_l and the high frequency band power Pow_h, and the high-to-low frequency band power ratio Pv is output. Here, in a case where the high-to-low frequency band power ratio Pv is higher than a prescribed upper limit threshold value Pv_H, the power ratio Pv is limited to the threshold value Pv_H. In a case where the high-to-low frequency band power ratio Pv is lower than a prescribed lower limit threshold value Pv_L, the power ratio Pv is limited to the threshold value Pv_L.

$$Pow\_l=\Sigma A[f];\ f=0, \ldots, 63$$

$$Pow\_h=\Sigma A[f];\ f=64, \ldots, 127$$

$$Pv=Pow\_h/Pow\_l$$

$$\text{Here, } Pv=Pv\_H;\ Pv>Pv\_H$$

$$Pv=Pv\_L;\ Pv<Pv\_L \qquad (19)$$

As is described above, in the fifth embodiment, the perceptual weight distributing pattern min_gain_pat[f] of both the first perceptual weight and the second perceptual weight is changed according to the ratio Pv of the high frequency band power Pow_h to the low frequency band power Pow_l obtained from the average spectrum A[f] of both the amplitude spectrum S[f] and the noise spectrum N[f]. Therefore, though it is difficult to judge the transitional time period of the voice such as consonant to be a speech time period and the transitional time period of the voice such as consonant is erroneously judged to be a noise time period, shapes of both the amplitude spectrum S[f] of the input signal and the noise spectrum N[f] are added to the perceptual weight distributing pattern min_gain_pat[f] in this embodiment. Accordingly, the spectral subtraction and the spectral amplitude suppression are performed while being adapted to the frequency characteristic of the transitional time period, and the noise suppression further preferable for the feeling in the hearing sensation can be performed.

Also, in the fifth embodiment, the average spectrum A[f] of both the amplitude spectrum S[f] of the input signal and the noise spectrum N[f] is obtained according to the noise-likeness signal Noise. Therefore, as compared with a case where the weighting factor Cn is set to a fixed value, the average spectrum A[f] further adapted to the state of the voiced sound and noises in the current frame can be obtained, and the noise suppression preferable for the feeling in the hearing sensation can be performed.

EMBODIMENT 6

Figure 11:
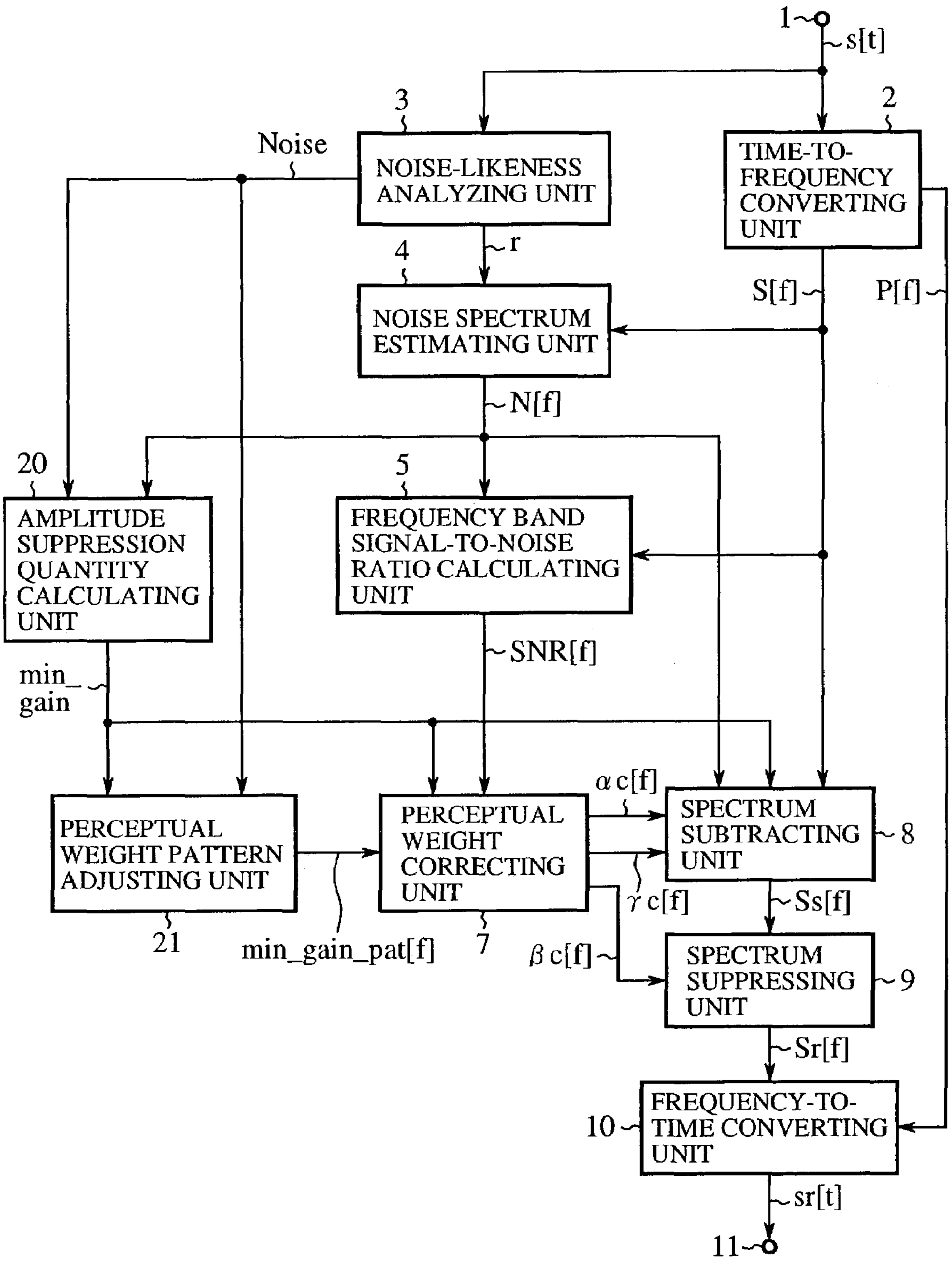
FIG. 11 is a block diagram showing the configuration of a noise suppressing apparatus according to a sixth embodiment of the present invention.

FIG. 11 is a block diagram showing the configuration of a noise suppressing apparatus according to a sixth embodiment of the present invention. In FIG. 11, 7 indicates a perceptual weight correcting unit for outputting a corrected spectral subtraction quantity αc[f] denoting a first corrected perceptual weight, a corrected spectral amplitude suppression quantity βc[f] denoting a second corrected perceptual weight and a third perceptual weight γc[f]. The other configuration is the same as that shown in FIG. 4 of the first embodiment. In this embodiment, a spectrum signal obtained by weighting the amplitude spectrum S[f] of the input signal in the frequency direction in the speech time period is, for example, used to perform the back filling processing in the spectrum subtracting unit 8 in a case where a noise subtracted spectrum Ss[f] is negative.

In the spectrum subtracting unit 8, as is formulated in an equation (20), the noise spectrum N[f] is multiplied by the first corrected perceptual weight αc(f) to obtain a multiplied spectrum, the multiplied spectrum is subtracted from the amplitude spectrum S[f] to obtain a noise subtracted spectrum Ss[f], and the noise subtracted spectrum Ss[f] is output.

Also, in a case where the noise subtracted spectrum Ss[f] becomes negative, the back filling processing is performed. That is, the noise subtracted spectrum Ss[f] is multiplied by the amplitude suppression quantity min_gain and is further multiplied by the third perceptual weight γc[f] which is output from the perceptual weight correcting unit 7 and is increased as the frequency f is heightened, and an obtained multiplied spectrum is set as the noise subtracted spectrum Ss[f].

$$\begin{aligned} Ss[f] &= S[f] - \alpha c(f) \times N[f]; \quad S[f] > \alpha c(f) \times N[f] \\ &= \gamma c(f) \times \text{min\_gain} \times S[f]; \quad \text{other cases} \end{aligned} \tag{20}$$

Next, an operation will be described below.

Here, the third perceptual weight γc[f] in the equation (20) is produced according to a following equation (21).

$$\text{SNR\_g} = (\text{SNR\_MAX} - SNR[f]) \times \text{C\_snr} \tag{21}$$

$$\begin{aligned} \gamma c[f] &= \gamma_H[f]; && \gamma w[f] \times \text{SNR\_g} > \gamma_H[f] \\ &= \gamma_W[f] \times \text{SNR\_g}; && \gamma_L[f] \leqq \gamma w[f] \times \text{SNR\_g} \leqq \gamma_H[f] \\ &= \gamma_L[f]; && \gamma_W[f] \times \text{SNR\_g} < \gamma_L[f] \end{aligned}$$

Here, SNR_MAX and C_snr in the equation (21) denote positive constant values respectively and relate to the control based on the SN ratio of the third perceptual weight γc[f]. Also, $\gamma_H$[f] and $\gamma_L$[f] denote constant values defined for each frequency band f, and the relation $$0<\gamma_L[f]<\gamma_H[f], f=0, \ldots, fc$$

is satisfied. That is, in the equation (21), the higher the frequency band SN ratio, the lower the value of γc[f]. In contrast, the lower the frequency band SN ratio, the higher the value of γc[f].

Figure 12:
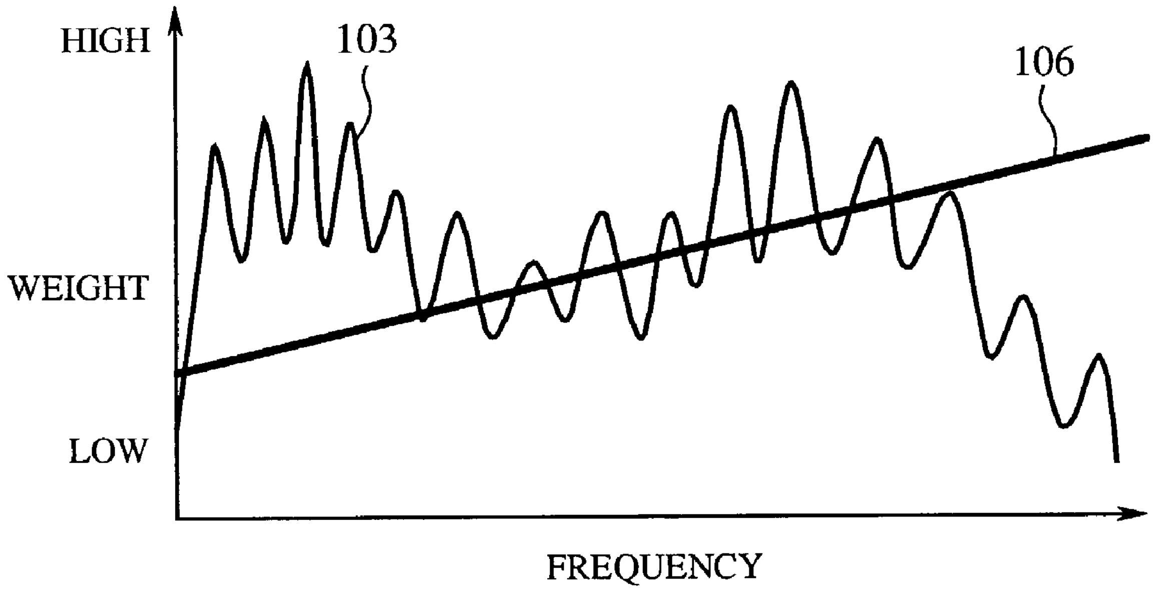
FIG. 12 is a view showing an example of a frequency direction pattern of a third perceptual weight in the noise suppressing apparatus of the sixth embodiment of the present invention.

In the input speech signal obtained in the running of a motor vehicle, as the frequency is heightened, the SN ratio is generally reduced, and the absolute value of a power of the noise spectral component is reduced. Therefore, as a result of the spectral subtraction, because the SN ratio is reduced as the frequency is heightened, the spectral component is often set to a negative value. The spectral component of the negative value is one of causes of the generation of the musical noise, and there is a high probability that an isolated sharp spectral component is generated. Therefore, as shown in FIG. 12, the third perceptual weight γc[f], with which the perceptual weighting is performed for the amplitude spectrum S[f] of the input signal used for the back filling processing, is heightened as the frequency is heightened. Therefore, the back filling quantity is increased as the frequency is heightened, and the generation of the isolated sharp spectral component is prevented. Here, in FIG. 12, 103 indicates a speech spectrum, and 106 indicates an example of a frequency-directional pattern of the third perceptual weight γc[f].

Figure 13A:
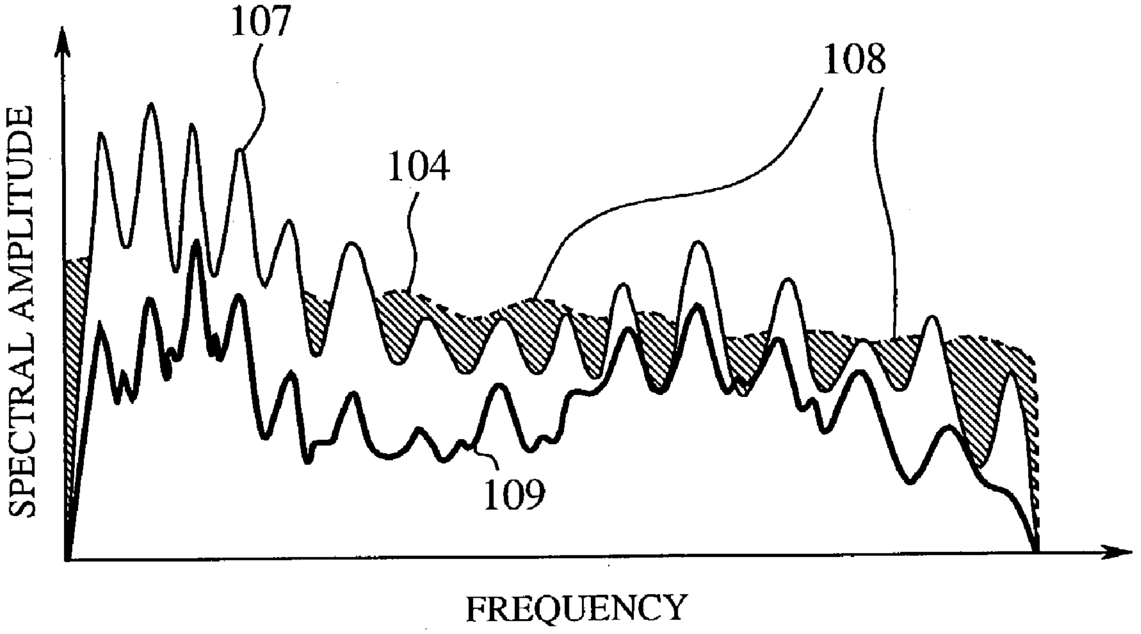
FIG. 13A and FIG. 13B are views respectively showing an example of a noise subtracted spectrum in a case where no perceptual weight is performed in the noise suppressing apparatus of the sixth embodiment of the present invention.
Figure 13B:
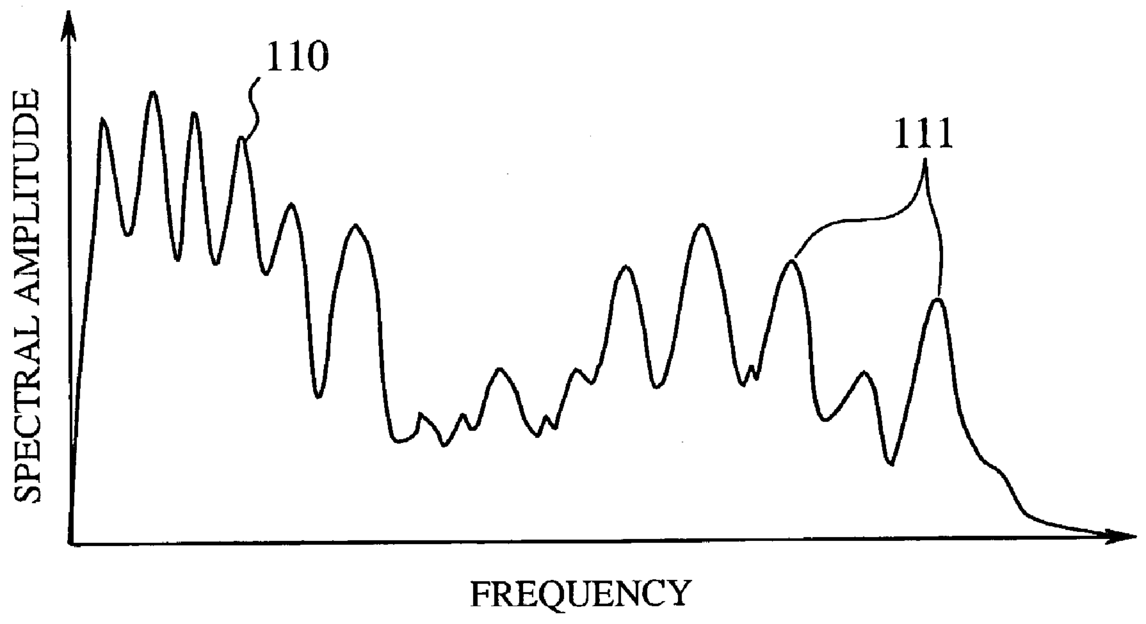
Figure 14A:
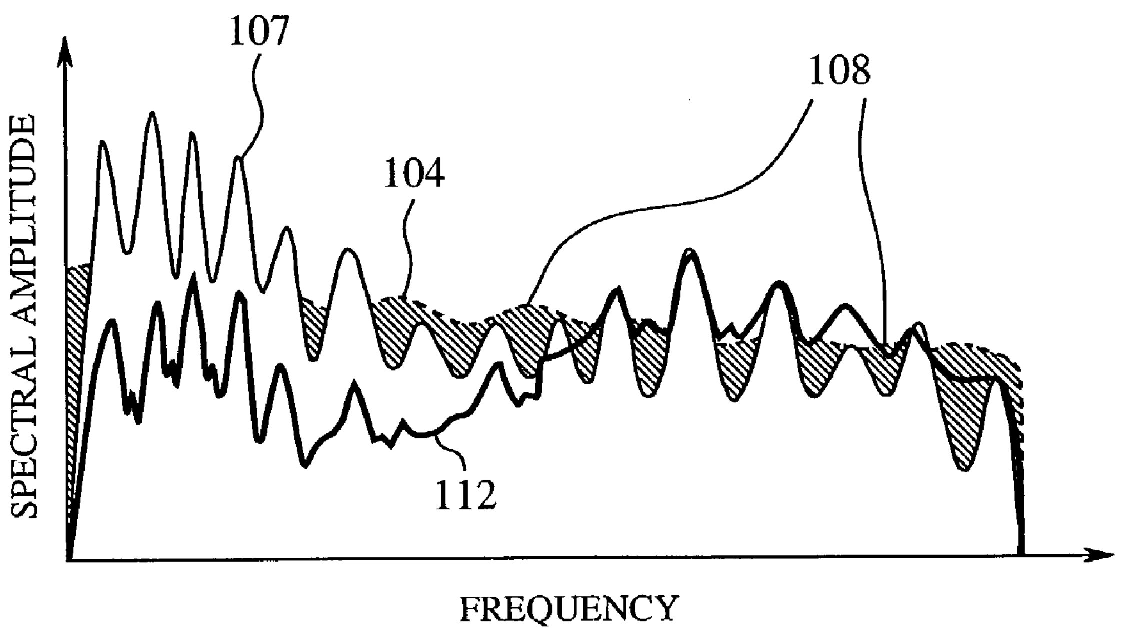
FIG. 14A and FIG. 14B are views respectively showing an example of a noise subtracted spectrum in a case where a perceptual weight is performed in the noise suppressing apparatus of the sixth embodiment of the present invention.
Figure 14B:
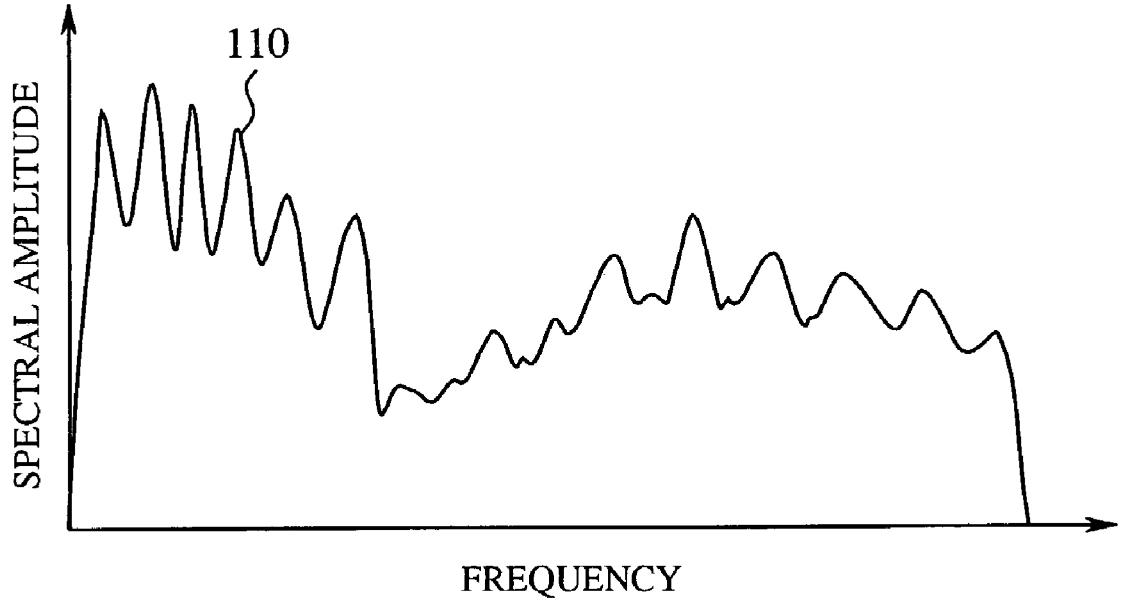

FIG. 13A, FIG. 13B, FIG. 14A and FIG. 14B are views respectively showing an example of the noise subtracted spectrum Ss[f]. FIG. 13A and FIG. 13B show a case where the amplitude spectrum S[f] of the input signal is back-filled by using a non-weighted spectrum. FIG. 14A and FIG. 14B show a case where the amplitude spectrum S[f] of the input signal is back-filled by using a spectrum weighted with the third perceptual weight γc[f]. In FIG. 13A and FIG. 14A, 104 indicates a noise spectrum, 107 indicates a spectrum shape obtained by performing the spectral subtraction: S[f]−αc[f]×N[f], 108 indicates an area in which the spectral component is negative, 109 indicates a back-filled spectrum obtained by multiplying the input amplitude spectrum by the amplitude suppression quantity min_gain, and 112 indicates a back-filled spectrum obtained by multiplying the input amplitude spectrum by both the amplitude suppression quantity min_gain and the third perceptual weight γc[f]. Also, in FIG. 13B and FIG. 14B, 110 indicates the noise subtracted spectrum Ss[f], and 111 indicates an isolated spectral component. FIG. 13B is a view showing a result of the back filling processing in which the area 108 shown in FIG. 13A corresponding to the spectral component set to a negative value is back-filled. FIG. 14B is a view showing a result of the back filling processing in which the area 108 shown in FIG. 14A corresponding to the spectral component set to a negative value is back-filled.

In the comparison of FIG. 13B and FIG. 14B, the sharp spectral component of the high frequency band generated in FIG. 13B is disappeared in FIG. 14B, and it is realized that the musical noise can be reduced. As is described above, in the sixth embodiment, the amplitude spectrum S[f] used for the back filling processing is weighted with the perceptual weight which is heightened as the frequency is heightened. Therefore, as the frequency is heightened, the amplitude of the back-filling spectral component is enlarged, and the back filling quantity is enlarged. Accordingly, the generation of a sharp spectrum, which is isolated on the frequency axis and is one of causes of the generation of the musical noise, can be suppressed.

Also, in the sixth embodiment, the spectrum shape of the residual noises of the high frequency band can be made similar to the amplitude spectrum S[f] of the input signal in the speech time period. Therefore, the residual noises of the high frequency band become similar to the speech signal, the natural feeling of the speech can be improved, and the noise suppression preferable for the feeling in the hearing sensation can be performed.

EMBODIMENT 7

A block diagram showing the configuration of a noise suppressing apparatus according to a sixth embodiment of the present invention is the same as that shown in FIG. 11 of the sixth embodiment. In the seventh embodiment, in place of the amplitude spectrum S[f] of the input signal, the noise spectrum N[f] is used in the spectrum subtracting unit 8 for the back filling processing in the noise time period.

Next, an operation will be described below.

The amplitude spectrum S[f] of the input signal is considerably changed with time and frequency in the noise time period, and the noise spectrum N[f] has an average noise spectrum shape and is stable in the time and frequency directions. Therefore, in the spectrum subtracting unit 8, the noise spectrum N[f] is set as a back-filling spectrum in place of the amplitude spectrum S[f] in the equation (20), a spectrum of γc(f)×min_gain×N[f] is set as a noise subtracted spectrum Ss[f], and the residual noises are stabilized in the time and frequency directions.

As is described above, in the seventh embodiment, the noise spectrum N[f] used for the back filling processing is weighted with the perceptual weight which is heightened as the frequency is heightened. Therefore, as the frequency is heightened, the amplitude of the back-filling spectral component is enlarged, and the back filling quantity is enlarged. Accordingly, the generation of a sharp spectrum, which is isolated on the frequency axis and is one of causes of the generation of the musical noise, can be suppressed.

Also, in the seventh embodiment, in the noise time period, the spectrum shape of the residual noises of the high frequency band can be made similar to the noise spectrum N[f] having an average noise spectrum shape and stable in the time and frequency directions. Therefore, the residual noises of the high frequency band can be stabilized in the time and frequency directions, and the noise suppression preferable for the feeling in the hearing sensation can be performed.

EMBODIMENT 8

Figure 15:
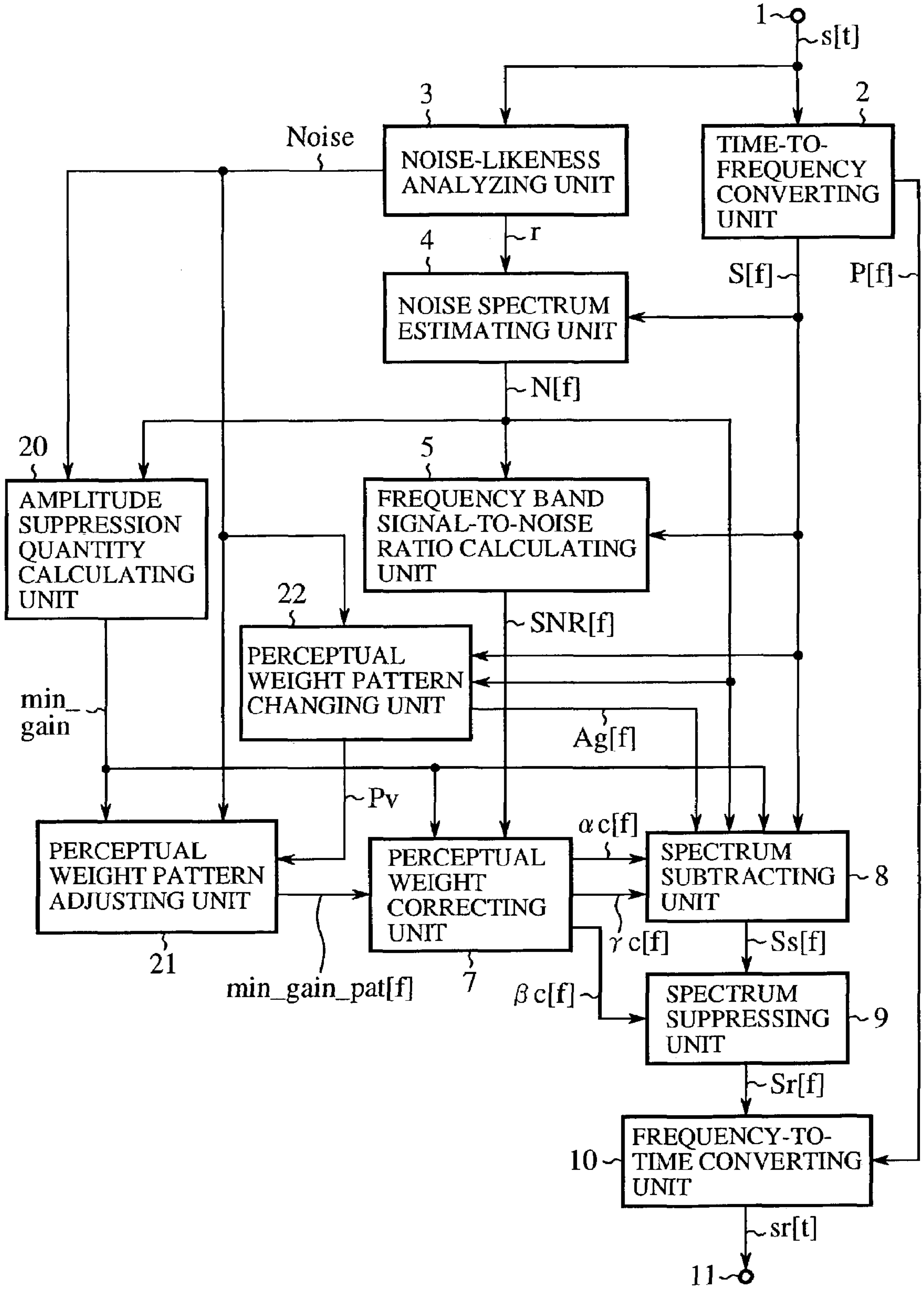
FIG. 15 is a block diagram showing the configuration of a noise suppressing apparatus according to an eighth embodiment of the present invention.

FIG. 15 is a block diagram showing the configuration of a noise suppressing apparatus according to an eighth embodiment of the present invention. In FIG. 15, the perceptual weight pattern changing unit 22 has the function of the perceptual weight pattern changing unit 22 shown in FIG. 10 of the fifth embodiment. In addition, an obtained average spectrum Ag[f] is output from the perceptual weight pattern changing unit 22 to the spectrum subtracting unit 8. Also, the perceptual weight correcting unit 7 is the same as the perceptual weight correcting unit 7 shown in FIG. 11 of the sixth embodiment. In the spectrum subtracting unit 8, in place of the amplitude spectrum S[f] of the input signal used for the back filling processing, the average spectrum Ag[f] obtained from a weighted average of both the amplitude spectrum S[f] of the input signal and the noise spectrum N[f] is used for the back filling processing in the transitional time period of the voice such as consonant.

Next, an operation will be described below.

As an example, in the same manner as the method described in the fifth embodiment, in the perceptual weight pattern changing unit 22, both the amplitude spectrum S[f] composed of the 128-point samples output from the time-to-frequency converting unit 2 and the noise spectrum N[f] output from the noise spectrum estimating unit 4 are received, an average spectrum Ag[f] is calculated according to a following equation (22). Here, Cng in the equation (22) denotes a prescribed weighting factor, for example, determined according to the state of the noise-likeness signal Noise shown in FIG. 2. In a case where the noise-likeness signal Noise is ranged from zero to two, there is a high probability that the current frame is placed in the noise time period, Cng=0.7 is set, and the noise spectrum N[f] is weighted. In contrast, in a case where the noise-likeness signal Noise is ranged from three to four, there is a high probability that the current frame is placed in the speech time period, Cng=0.3 is set, and the amplitude spectrum S[f] of the input signal is weighted.

$$Ag[f]=(1-Cng)\times S[f]+Cng\times N[f] \qquad (22)$$

In the spectrum subtracting unit 8, as is formulated in a following equation (23), the noise spectrum N[f] is multiplied by the corrected spectral subtraction quantity αc(f) to obtain a multiplied spectrum, the multiplied spectrum is subtracted from the amplitude spectrum S[f] to obtain a noise subtracted spectrum Ss[f], and the noise subtracted spectrum Ss[f] is output. Also, in a case where the noise subtracted spectrum Ss[f] becomes negative, the back filling processing is performed. That is, the average spectrum Ag[f] obtained according to the equation (22) is multiplied by the amplitude suppression quantity min_gain and is further multiplied by the third perceptual weight γc[f] which is increased as the frequency f is heightened, and an obtained multiplied spectrum is set as a noise subtracted spectrum Ss[f].

$$\begin{aligned} Ss[f] &= S[f] - \alpha c(f)\times N[f]; & S[f] > \alpha c(f)\times N[f] \\ &= \gamma c(f)\times \text{min\_gain}\times Ag[f]; & \text{other cases} \end{aligned} \qquad (23)$$

As is described above, in the eighth embodiment, the average spectrum Ag[f] obtained from both the amplitude spectrum S[f] of the input signal and the noise spectrum N[f] and used for the back filling processing is weighted with the perceptual weight which is heightened as the frequency is heightened. Therefore, as the frequency is heightened, the amplitude of the back-filling spectral component is enlarged, and the back filling quantity is enlarged. Accordingly, the generation of a sharp spectrum, which is isolated on the frequency axis and is one of causes of the generation of the musical noise, can be suppressed.

Also, in the eighth embodiment, though it is difficult to judge the transitional time period of the voice such as consonant to be a speech time period and the transitional time period of the voice such as consonant is erroneously judged to be a noise time period, both the amplitude spectrum S[f] of the input signal and the noise spectrum N[f] are added to the spectrum of the residual noises of the high frequency band. Accordingly, the natural feeling of the residual noises can be improved, and the noise suppression preferable for the feeling in the hearing sensation can be performed.

Also, in the eighth embodiment, the average spectrum Ag[f] of both the amplitude spectrum S[f] of the input signal and the noise spectrum N[f] is obtained according to the noise-likeness signal Noise. Therefore, as compared with a case where the weighting factor Cng is set to a fixed value, the average spectrum Ag[f] further adapted to the state of the voiced sound and noises in the current frame can be obtained, and the noise suppression preferable for the feeling in the hearing sensation can be performed.

EMBODIMENT 9

Figure 16:
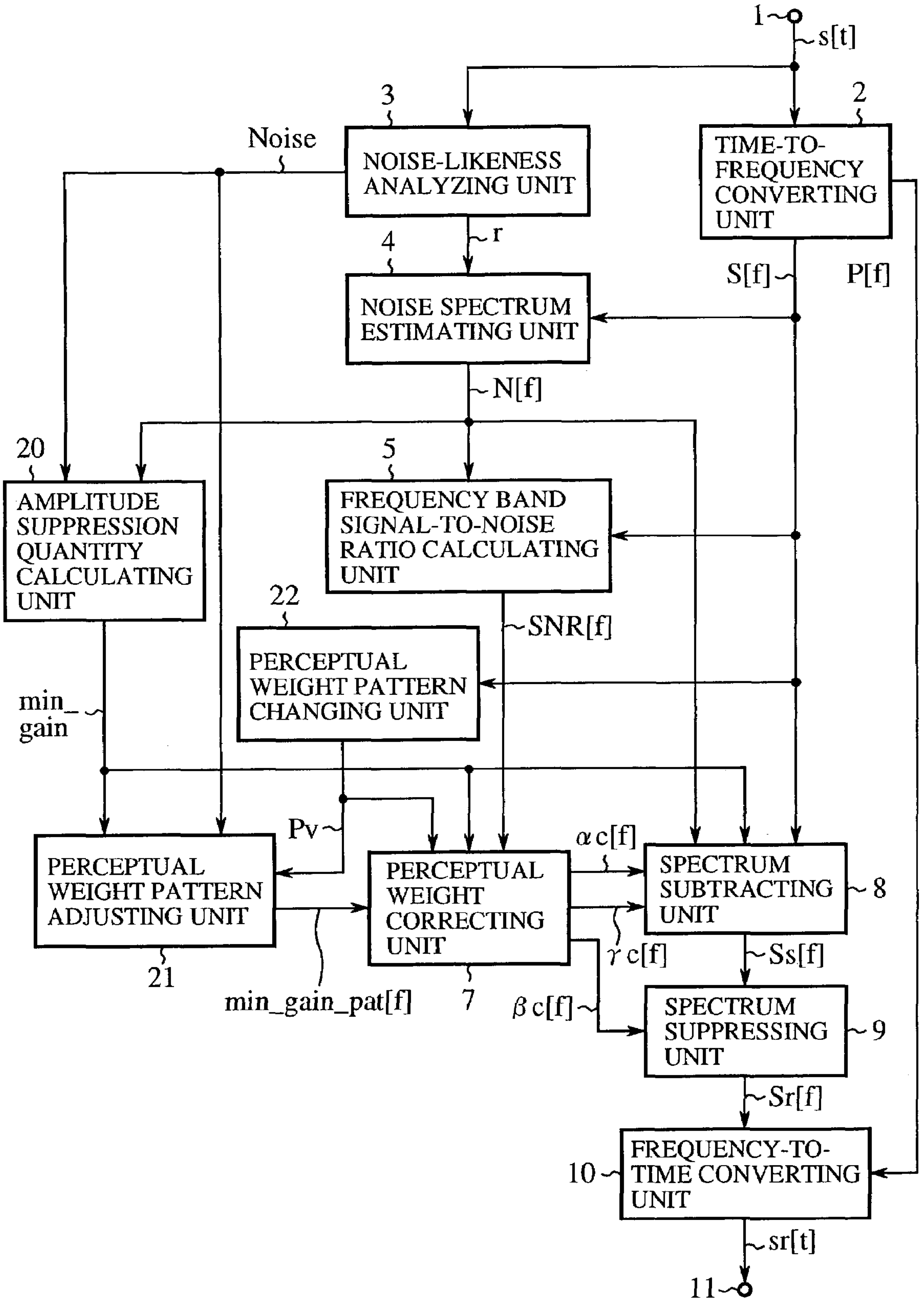
FIG. 16 is a block diagram showing the configuration of a noise suppressing apparatus according to a ninth embodiment of the present invention.

FIG. 16 is a block diagram showing the configuration of a noise suppressing apparatus according to a ninth embodiment of the present invention. In this embodiment, the ratio Pv of the high frequency band power to the low frequency band power in the amplitude spectrum S[f] is output from the spectrum subtracting unit 8 to both the perceptual weight pattern adjusting unit 21 and the perceptual weight correcting unit 7. In the perceptual weight correcting unit 7, the third perceptual weight γc[f] is changed according to the ratio Pv of the high frequency band power of the amplitude spectrum S[f] to the low frequency band power of the amplitude spectrum S[f]. Thereafter, the corrected spectral subtraction quantity αc[f], the corrected spectral subtraction quantity βc[f] and the third changed perceptual weight γc[f] are output. In this embodiment, for example, the amplitude spectrum S[f] obtained from the input signal of the current frame is divided into a spectrum of a low frequency band and a spectrum of a high frequency band in the speech time period, a low frequency band power Pow_l of the low frequency band spectrum and a high frequency band power Pow_h of the high frequency band spectrum are calculated, and the third perceptual weight γc[f] is changed according to the ratio Pv of the high frequency band power to the low frequency band power.

Next, an operation will be described below.

In the perceptual weight correcting unit 7, the third perceptual weight γc[f] is changed according to a following equation (24) by using the high-to-low frequency band power ratio Pv of the amplitude spectrum S[f] output from the perceptual weight pattern changing unit 22. Here, fc in the equation (24) denotes a Nyquist frequency.

$$\gamma c[f]=\gamma c[f]\times(1.0\times(fc-f)+Pv\_inv\times f)/fc$$

Here, $$Pv\_inv=1.0/Pv$$

$$\gamma c[f]=1.0;\ \gamma c[f]>1.0 \quad (24)$$

As is described above, in the ninth embodiment, many components of the speech signal are included in the amplitude spectrum S[f] of the input signal in the speech time period, and the third perceptual weight γc[f] is changed according to the ratio Pv of the high frequency band power of the amplitude spectrum S[f] to the low frequency band power of the amplitude spectrum S[f]. Therefore, the perceptual weighting is performed for the back-filling spectral component so as to make the back-filling spectral component approximate to the frequency characteristic of the speech signal, and the signal component of the back-filling frequency band is made similar to the speech signal. Also, because the spectral subtraction and the spectral amplitude subtraction adapted to the frequency characteristic of the speech time period are performed, the generation of the music noise can be suppressed, and the noise suppression preferable for the feeling in the hearing sensation can be performed.

EMBODIMENT 10

Figure 17:
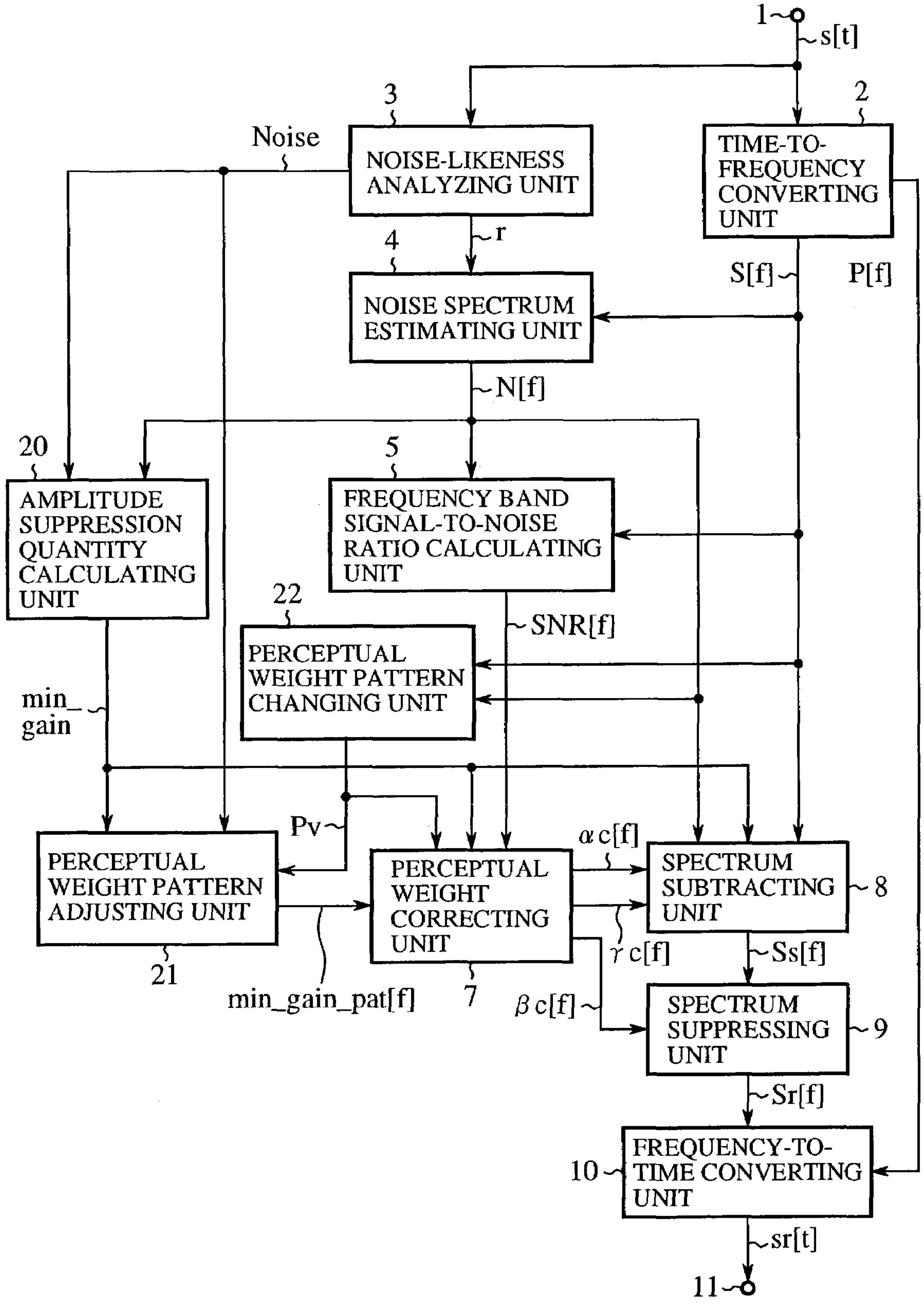
FIG. 17 is a block diagram showing the configuration of a noise suppressing apparatus according to a tenth embodiment of the present invention.

FIG. 17 is a block diagram showing the configuration of a noise suppressing apparatus according to a tenth embodiment of the present invention. In this embodiment, the ratio Pv of the high frequency band power of the noise spectrum N[f] to the low frequency band power of the noise spectrum N[f] is output from the perceptual weight pattern changing unit 22 to both the perceptual weight pattern adjusting unit 21 and the perceptual weight correcting unit 7. In the perceptual weight correcting unit 7, the third perceptual weight γc[f] is changed according to the ratio Pv of the high frequency band power of the noise spectrum N[f] to the low frequency band power of the noise spectrum N[f]. Thereafter, the corrected spectral subtraction quantity αc[f], the corrected spectral subtraction quantity βc[f] and the third changed perceptual weight γc[f] are output. In this embodiment, in place of the amplitude spectrum S[f] of the input signal, the noise spectrum N[f] is, for example, divided into a spectrum of a low frequency band and a spectrum of a high frequency band in the noise time period, a low frequency band power Pow_l of the low frequency band spectrum and a high frequency band power Pow_h of the high frequency band spectrum are calculated, and the third perceptual weight γc[f] is changed according to the ratio Pv of the high frequency band power Pow_h to the low frequency band power Pow_l.

As is described above, in the tenth embodiment, in the noise time period, in place of the amplitude spectrum S[f] of the input signal unstable in the time and frequency directions, the third perceptual weight γc[f] is changed according to the ratio Pv of the high frequency band power of the noise spectrum N[f] to the low frequency band power of the noise spectrum N[f] which has an average noise spectrum shape and is stable in the time and frequency directions. Therefore, the perceptual weighting is performed for the back-filling spectral component so as to make the back-filling spectral component approximate to the frequency characteristic of the noise spectrum N[f], and the back-filling spectrum is stabilized in the time and frequency directions. Also, because the spectral subtraction and the spectral amplitude subtraction adapted to the frequency characteristic of the noise time period are performed, the generation of the music noise can be suppressed, and the noise suppression preferable for the feeling in the hearing sensation can be performed.

EMBODIMENT 11

Figure 18:
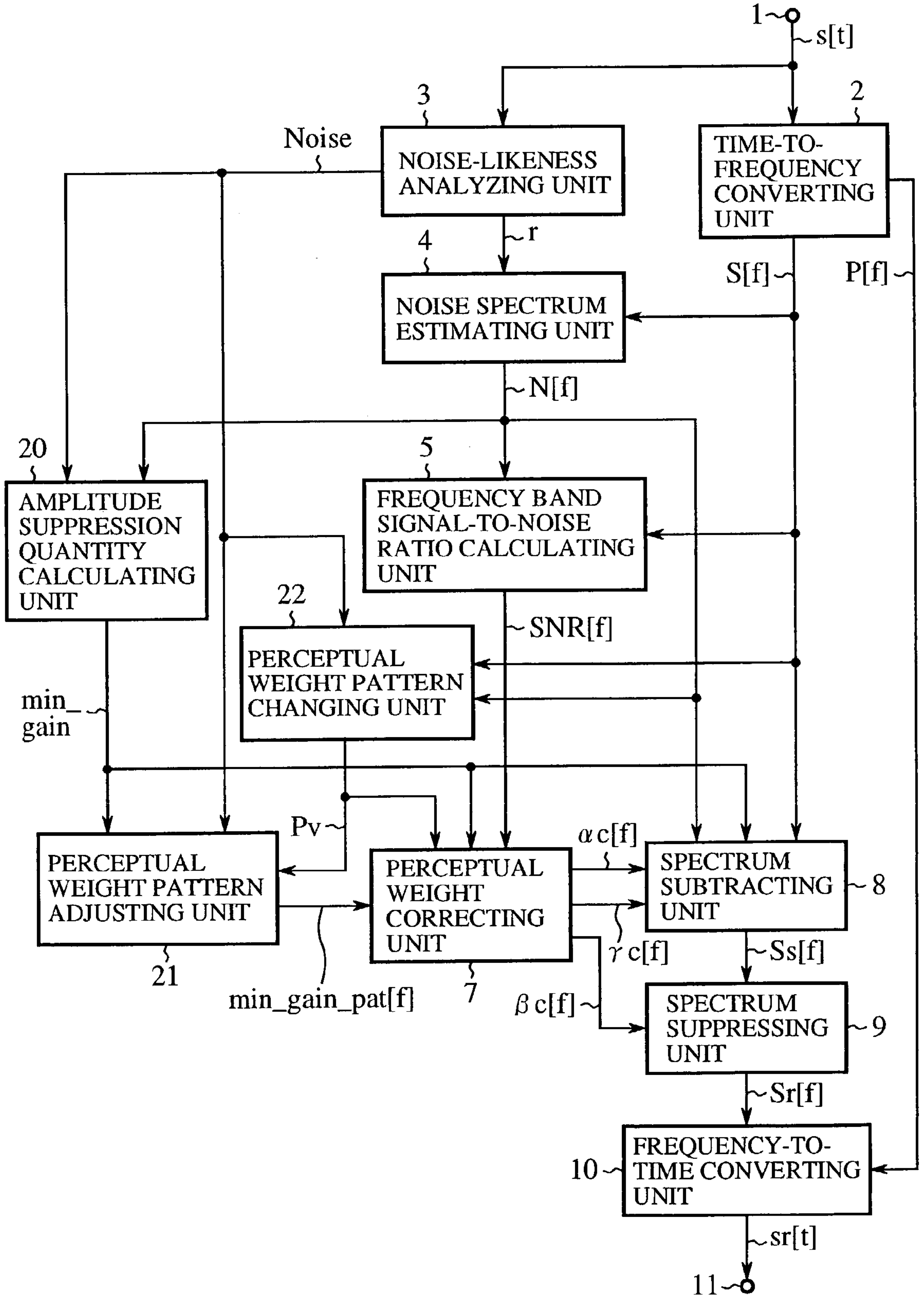
FIG. 18 is a block diagram showing the configuration of a noise suppressing apparatus according to an eleventh embodiment of the present invention.

FIG. 18 is a block diagram showing the configuration of a noise suppressing apparatus according to an eleventh embodiment of the present invention. In this embodiment, the third perceptual weight γc[f] is changed according to the ratio Pv of the high frequency band power to the low frequency band power obtained from the average spectrum Ag[f] of both the amplitude spectrum S[f] of the input signal and the noise spectrum N[f]. Therefore, though it is difficult to judge the transitional time period of the voice such as consonant to be a speech time period and the transitional time period of the voice such as consonant is erroneously judged to be a noise time period, the perceptual weighting is performed for the back-filling spectrum in the transitional time period of the voice such as consonant so as to make the back-filling spectrum approximate to the frequency characteristic of both the amplitude spectrum S[f] of the input signal and the noise spectrum N[f], and the back-filling spectrum is stabilized in the time and frequency directions. Also, in the transitional time period of the voice such as consonant, the back-filling spectrum is made similar to the frequency characteristic of the speech signal, and the spectral subtraction and the spectral amplitude subtraction adapted to the frequency characteristic of the transitional time period are performed. Accordingly, the generation of the music noise can be suppressed, and the noise suppression preferable for the feeling in the hearing sensation can be performed.

Also, in the eleventh embodiment, the average spectrum Ag[f] of both the amplitude spectrum S[f] of the input signal and the noise spectrum N[f] is obtained according to the noise-likeness signal Noise. Therefore, as compared with a case where the weighting factor Cng is set to a fixed value, the average spectrum Ag[f] adapted to the state of the voiced sound and noises in the current frame can be obtained, and the noise suppression further preferable for the feeling in the hearing sensation can be performed.

INDUSTRIAL APPLICABILITY

As is described above, the noise suppressing apparatus according to the present invention is appropriate to an apparatus in which noises other than an object signal are suppressed in a speech communication system or a speech recognition system used in various noise circumstances.

What is claimed is:

1. A noise suppressing apparatus, comprising:

a time-to-frequency converting unit for performing a frequency analysis for an input signal and converting the input signal to both an amplitude spectrum and a phase spectrum;

a noise-likeness analyzing unit for judging the input signal to obtain noise-likeness from the input signal, outputting a noise-likeness signal indicating the noise-likeness, and outputting a noise spectrum updating rate coefficient corresponding to the noise-likeness signal;

a noise spectrum estimating unit for updating a noise spectrum according to the noise spectrum updating rate coefficient output from the noise-likeness analyzing unit, the amplitude spectrum output from the time-to-frequency converting unit and an average noise spectrum of a past time, and outputting the noise spectrum;

a frequency band signal-to-noise ratio calculating unit for calculating a frequency band signal-to-noise ratio denoting a ratio of a signal to a noise from the amplitude spectrum output from the time-to-frequency converting unit and the noise spectrum output from the noise spectrum estimating unit for each frequency band;

an amplitude suppression quantity calculating unit for calculating an amplitude suppression quantity denoting a noise suppression level of a current frame from the noise-likeness signal output from the noise-likeness analyzing unit and the noise spectrum output from the noise spectrum estimating unit;

a perceptual weight pattern adjusting unit for determining a perceptual weight distributing pattern denoting a frequency characteristic distributing pattern of both a spectral subtraction quantity denoting a first perceptual weight and a spectral amplitude suppression quantity denoting a second perceptual weight from the amplitude suppression quantity calculated by the amplitude suppression quantity calculating unit and the noise-likeness signal output from the noise-likeness analyzing unit;

a perceptual weight correcting unit for correcting the spectral subtraction quantity denoting the first perceptual weight and the spectral amplitude suppression quantity denoting the second perceptual weight output from the perceptual weight pattern adjusting unit according to the frequency band signal-to-noise ratio calculated by the frequency band signal-to-noise ratio calculating unit and outputting a corrected spectral subtraction quantity and a corrected spectral amplitude suppression quantity, wherein the corrected spectral subtraction quantity decreases with increasing frequency and the corrected spectral amplitude suppression quantity increases with said increasing frequency;

a spectrum subtracting unit for subtracting a spectrum, which is obtained by multiplying the corrected spectral subtraction quantity output from the perceptual weight correcting unit by the noise spectrum output from the noise spectrum estimating unit, from the amplitude spectrum obtained by the time-to-frequency converting unit to obtain a noise subtracted spectrum;

a spectrum suppressing unit for multiplying the noise subtracted spectrum obtained by the spectrum subtracting unit by the corrected spectral amplitude suppression quantity output from the perceptual weight correcting unit to obtain a noise suppressed spectrum; and a frequency-to-time converting unit for converting the noise suppressed spectrum obtained by the spectrum suppressing unit to a time signal according to the phase spectrum obtained by the time-to-frequency converting unit and outputting a noise suppressed signal.

2. The noise suppressing apparatus according to claim 1, wherein the spectral subtraction quantity denoting the first perceptual weight is enlarged by the perceptual weight correcting unit in a low frequency band corresponding to the frequency band signal-to-noise ratio of a high value, the spectral amplitude suppression quantity denoting the second perceptual weight is reduced by the perceptual weight correcting unit in the low frequency band, the spectral subtraction quantity denoting the first perceptual weight is reduced by the perceptual weight correcting unit in a high frequency band corresponding to the frequency band signal-to-noise ratio of a low value, and the spectral amplitude suppression quantity denoting the second perceptual weight is enlarged by the perceptual weight correcting unit in the high frequency band.

3. The noise suppressing apparatus according to claim 1, wherein a plurality of perceptual weight basic distributing patterns denoting a plurality of frequency characteristic patterns corresponding to a plurality of values of the noise-likeness signal are prepared by the perceptual weight pattern adjusting unit as a basis of the determination of the perceptual weight distributing pattern, one frequency characteristic pattern corresponding to the noise-likeness signal output from the noise-likeness analyzing unit is selected, and the perceptual weight distributing pattern denoting the selected frequency characteristic pattern is determined by the perceptual weight pattern adjusting unit.

4. The noise suppressing apparatus according to claim 3, wherein the perceptual weight basic distributing patterns denoting the frequency characteristic patterns prepared by the perceptual weight pattern adjusting unit are arbitrarily changed according to use circumstances.

5. The noise suppressing apparatus according to claim 1, further comprising:

a perceptual weight pattern changing unit for calculating a ratio of a high frequency band power of the amplitude spectrum output from the time-to-frequency converting unit to a low frequency band power of the amplitude spectrum, wherein the perceptual weight distributing pattern is determined by the perceptual weight pattern adjusting unit according to the ratio of the high frequency band power of the amplitude spectrum to the low frequency band power of the amplitude spectrum.

6. The noise suppressing apparatus according to claim 5, wherein a third perceptual weight is enlarged as a frequency is heightened, and the third perceptual weight is changed by the perceptual weight correcting unit according to the ratio of the high frequency band power of the amplitude spectrum to the low frequency band power of the amplitude spectrum.

7. The noise suppressing apparatus according to claim 1, further comprising:

a perceptual weight pattern changing unit for calculating a ratio of a high frequency band power of the noise spectrum output from the noise spectrum estimating unit to a low frequency band power of the noise spectrum, wherein the perceptual weight distributing pattern is determined by the perceptual weight pattern adjusting unit according to the ratio of the high frequency band power of the noise spectrum to the low frequency band power of the noise spectrum.

8. The noise suppressing apparatus according to claim 7, wherein a third perceptual weight is enlarged as a frequency is heightened, and the third perceptual weight is changed by the perceptual weight correcting unit according to the ratio of the high frequency band power of the noise spectrum to the low frequency band power of the noise spectrum.

9. The noise suppressing apparatus according to claim 1, further comprising:

a perceptual weight pattern changing unit for calculating a ratio of a high frequency band power of an average spectrum obtained from a weighted average of both the amplitude spectrum output from the time-to-frequency converting unit and the noise spectrum output from the noise spectrum estimating unit to a low frequency band power of the average spectrum, wherein the perceptual weight distributing pattern is determined by the perceptual weight pattern adjusting unit according to the ratio of the high frequency band power of the average spectrum to the low frequency band power of the average spectrum.

10. The noise suppressing apparatus according to claim 9, wherein the noise subtracted spectrum is calculated by the spectrum subtracting unit from the average spectrum calculated by the perceptual weight pattern changing unit, the amplitude suppression quantity calculated by the amplitude suppression quantity calculating unit and a third perceptual weight, which is output from the perceptual weight correcting unit and is enlarged as a frequency is heightened, in a case where the noise subtracted spectrum obtained as a subtracting result is negative.

11. The noise suppressing apparatus according to claim 9, wherein a third perceptual weight is enlarged as a frequency is heightened, and the third perceptual weight is changed by the perceptual weight correcting unit according to the ratio of the high frequency band power to the low frequency band power in the average spectrum obtained from the weighted average of both the amplitude spectrum and the noise spectrum.

12. The noise suppressing apparatus according to claim 9, wherein the average spectrum is calculated according to the noise-likeness signal by the perceptual weight pattern changing unit.

13. The noise suppressing apparatus according to claim 1, wherein the noise subtracted spectrum is calculated by the spectrum subtracting unit from the amplitude spectrum, the amplitude suppression quantity calculated by the amplitude suppression quantity calculating unit and a third perceptual weight, which is output from the perceptual weight correcting unit and is enlarged as a frequency is heightened, in a case where the noise subtracted spectrum obtained as a subtracting result is negative.

14. The noise suppressing apparatus according to claim 1, wherein the noise subtracted spectrum is calculated by the spectrum subtracting unit from the noise spectrum output from the noise spectrum estimating unit, the amplitude suppression quantity calculated by the amplitude suppression quantity calculating unit and a third perceptual weight, which is output from the perceptual weight correcting unit and is enlarged as a frequency is heightened, in a case where the noise subtracted spectrum obtained as a subtracting result is negative.

15. A noise suppressing apparatus wherein a noise other than an object signal included in an input signal is suppressed according to a spectrum subtraction quantity denoting a first perceptual weight and a spectrum amplitude suppression quantity denoting a second perceptual weight, the noise suppressing apparatus comprising:

amplitude suppression quantity calculating means for judging the input signal to obtain noise-likeness from the input signal, obtaining a noise spectrum from the input signal, and calculating an amplitude suppression quantity denoting a noise suppression level of a current frame according to the noise-likeness and the noise spectrum;

frequency characteristic distributing pattern determining means for determining a frequency characteristic distributing pattern to be used for both the spectrum subtraction quantity and the spectrum amplitude suppression quantity based on inputs from both the amplitude suppression quantity and the noise-likeness;

a spectrum subtracting means for subtracting a spectrum, obtained by multiplying the spectrum subtraction quantity by the noise spectrum, from the amplitude spectrum of the input signal to obtain a noise subtracted spectrum; and a spectrum suppressing means for multiplying the noise subtracted spectrum by the spectrum amplitude suppression quantity to obtain the noise suppression spectrum, wherein noise is suppressed by the spectrum subtracting means and spectrum suppressing means, and the spectral subtraction quantity decreases with increasing frequency and the spectral amplitude suppression quantity increases with said increasing frequency.

16. The noise suppressing apparatus according to claim 15, further comprising:

a perceptual weight correcting means for correcting the spectral subtraction quantity denoting the first perceptual weight and the spectrum amplitude suppression quantity denoting the second perceptual weight according to a frequency band SN ratio for each frequency band that is calculated from the amplitude spectrum and noise spectrum of the input signal, and for outputting the corrected spectrum subtraction quantity and the corrected spectrum amplitude suppression quantity, wherein the noise is suppressed according to the corrected spectrum subtraction quantity and the corrected spectrum amplitude suppression quantity.

17. A noise suppressing apparatus wherein a noise other than an object signal included in an input signal is suppressed according to a spectrum subtraction quantity denoting a first perceptual weight and a spectrum amplitude suppression quantity denoting a second perceptual weight, the noise suppressing apparatus comprising:

amplitude suppression quantity calculating means for judging the input signal to obtain noise-likeness from the input signal, obtaining a noise spectrum from the input signal, and calculating an amplitude suppression quantity denoting a noise suppression level of a current frame according to the noise-likeness and the noise spectrum;

frequency characteristic distributing pattern determining means for determining a frequency characteristic distributing pattern of both the spectrum subtraction quantity and the spectrum amplitude suppression quantity according to both the amplitude suppression quantity and the noise-likeness obtained by the amplitude suppression quantity calculating means; and perceptual weight correcting means for applying the frequency characteristic distributing pattern to the first perceptual weight and the second perceptual weight, wherein the spectral subtraction quantity decreases with increasing frequency and the spectral amplitude suppression quantity increases with said increasing frequency.

18. A noise suppressing apparatus, comprising:

a time-to-frequency conversion unit configured to perform a frequency analysis for an input signal and to convert the input signal to both an amplitude spectrum and a phase spectrum;

a noise-likeness analysis unit configured to judge the input signal to obtain noise-likeness from the input signal, to output a noise-likeness signal indicating the noise-likeness, and to output a noise spectrum updating rate coefficient corresponding to the noise-likeness signal;

a noise spectrum estimation unit configured to update a noise spectrum according to the noise spectrum updating rate coefficient output from the noise-likeness analysis unit, the amplitude spectrum output from the time-to-frequency conversion unit and an average noise spectrum of a past time, and to output the noise spectrum;

a frequency band signal-to-noise ratio calculation unit configured to calculate a frequency band signal-to-noise ratio denoting a ratio of a signal to a noise from the amplitude spectrum output from the time-to-frequency conversion unit and the noise spectrum output from the noise spectrum estimation unit for each frequency band;

an amplitude suppression quantity calculation unit configured to calculate an amplitude suppression quantity denoting a noise suppression level of a current frame from the noise-likeness signal output from the noise-likeness analyzing unit and the noise spectrum output from the noise spectrum estimating unit;

a perceptual weight pattern adjustment unit configured to determine a perceptual weight distributing pattern denoting a frequency characteristic distributing pattern of both a spectral subtraction quantity denoting a first perceptual weight and a spectral amplitude suppression quantity denoting a second perceptual weight from the amplitude suppression quantity calculated by the amplitude suppression quantity calculation unit and the noise-likeness signal output from the noise-likeness analysis unit;

a perceptual weight correction unit configured to correct the spectral subtraction quantity denoting the first perceptual weight and the spectral amplitude suppression quantity denoting the second perceptual weight output from the perceptual weight pattern adjustment unit according to the frequency band signal-to-noise ratio calculated by the frequency band signal-to-noise ratio calculation unit and to output a corrected spectral subtraction quantity and a corrected spectral amplitude suppression quantity, wherein the spectral subtraction quantity decreases with increasing frequency and the spectral amplitude suppression quantity increases with said increasing frequency;

a spectrum subtraction unit configured to subtract a spectrum, which is obtained by multiplying the corrected spectral subtraction quantity output from the perceptual weight correction unit by the noise spectrum output from the noise spectrum estimation unit, from the amplitude spectrum obtained by the time-to-frequency converting unit to obtain a noise subtracted spectrum;

a spectrum suppression unit configured to multiply the noise subtracted spectrum obtained by the spectrum subtraction unit by the corrected spectral amplitude suppression quantity output from the perceptual weight correction unit to obtain a noise suppressed spectrum; and a frequency-to-time conversion unit configured to convert the noise suppressed spectrum obtained by the spectrum suppression unit to a time signal according to the phase spectrum obtained by the time-to-frequency conversion unit and to output a noise suppressed signal.

19. A noise suppressing apparatus wherein a noise other than an object signal included in an input signal is suppressed according to a spectrum subtraction quantity denoting a first perceptual weight and a spectrum amplitude suppression quantity denoting a second perceptual weight, the noise suppressing apparatus comprising:

an amplitude suppression quantity calculator configured to judge the input signal to obtain noise-likeness from the input signal, to obtain a noise spectrum from the input signal, and to calculate an amplitude suppression quantity denoting a noise suppression level of a current frame according to the noise-likeness and the noise spectrum;

a frequency characteristic distributing pattern determination unit configured to determine a frequency characteristic distributing pattern to be used for both the spectrum subtraction quantity and the spectrum amplitude suppression quantity based on inputs from both the amplitude suppression quantity and the noise-likeness obtained by the amplitude suppression quantity calculator;

a spectrum subtracting unit configured to subtract a spectrum, obtained by multiplying the spectrum subtraction quantity by the noise spectrum, from the amplitude spectrum of the input signal to obtain a noise subtracted spectrum;

a spectrum suppressing unit configured to multiply the noise subtracted spectrum by the corrected spectrum amplitude suppression quantity to obtain the noise suppression spectrum, wherein noise is suppressed by the spectrum subtracting means and spectrum suppressing means; and a perceptual weight correction unit configured to apply the frequency characteristic distributing pattern to the first perceptual weight and the second perceptual weight, wherein the spectral subtraction quantity decreases with increasing frequency and the spectral amplitude suppression quantity increases with said increasing frequency.

* * * * *

UNITED STATES PATENT AND TRADEMARK OFFICE

CERTIFICATE OF CORRECTION

PATENT NO. : 7,302,065 B2
APPLICATION NO. : 10/343744
DATED : November 27, 2007
INVENTOR(S) : Satoru Furuta It is certified that error appears in the above-identified patent and that said Letters Patent is hereby corrected as shown below:

On the title page, Item (45) and the Notice should read as follows:

-- (45) **Date of Patent: *Nov. 27, 2007**

(*) Notice: Subject to any disclaimer, the term of this Patent is extended or adjusted under 35 U.S.C. 154(b) by 624 days.

This patent is subject to a terminal disclaimer. --

Signed and Sealed this

Fourteenth Day of July, 2009

JOHN DOLL

*Acting Director of the United States Patent and Trademark Office*